(12) United States Patent
Capasso et al.

(10) Patent No.: US 12,405,425 B2
(45) Date of Patent: Sep. 2, 2025

(54) WAVELENGTH MULTIPLEXER/DEMULTIPLEXER USING METAMATERIALS FOR OPTICAL FIBER COMMUNICATIONS

(71) Applicants: CORNING INCORPORATED, Corning, NY (US); President and Fellows of Harvard College, Cambridge, MA (US)

(72) Inventors: Federico Capasso, Cambridge, MA (US); Wei-Ting Chen, Plainsboro, NJ (US); Paulo Clovis Dainese, Jr., Painted Post, NY (US); Kangmei Li, San Jose, CA (US); Ming-Jun Li, Horseheads, NY (US); Jaewon Oh, Cambridge, MA (US); Jun Yang, Horseheads, NY (US)

(73) Assignees: CORNING INCORPORATED, Corning, NY (US); HARVARD COLLEGE, Cambridge, MA (US)

( * ) Notice: Subject to any disclaimer, the term of this patent is extended or adjusted under 35 U.S.C. 154(b) by 363 days.

(21) Appl. No.: 17/795,928

(22) PCT Filed: Jan. 29, 2021

(86) PCT No.: PCT/US2021/015918
§ 371 (c)(1),
(2) Date: Jul. 28, 2022

(87) PCT Pub. No.: WO2021/155302
PCT Pub. Date: Aug. 5, 2021

(65) Prior Publication Data
US 2023/0085821 A1 Mar. 23, 2023

Related U.S. Application Data

(60) Provisional application No. 62/968,531, filed on Jan. 31, 2020.

(51) Int. Cl.
*G02B 6/293* (2006.01)
*G02B 1/00* (2006.01)

(52) U.S. Cl.
CPC ......... *G02B 6/29367* (2013.01); *G02B 1/002* (2013.01); *G02B 6/2938* (2013.01)

(58) Field of Classification Search
CPC ........ G02B 6/29362–29367; G02B 1/002–007
See application file for complete search history.

(56) References Cited

U.S. PATENT DOCUMENTS

| | | | |
|---|---|---|---|
| 6,404,947 B1 | 6/2002 | Matsuda | |
| 9,612,402 B2 * | 4/2017 | Fattal | G02B 6/4215 |

(Continued)

FOREIGN PATENT DOCUMENTS

| | | |
|---|---|---|
| CN | 109597160 A | 4/2019 |
| TW | 201937204 A | 9/2019 |

OTHER PUBLICATIONS

Faraji-Dana, M. et al. "Hyperspectral Imager with Folded Metasurface Optics". ACS Photonics, vol. 6, 2019, pp. 2161-2167.

(Continued)

*Primary Examiner* — Rhonda S Peace
(74) *Attorney, Agent, or Firm* — Svetlana Z. Short

(57) ABSTRACT

Systems, devices, and techniques for performing wavelength division multiplexing or demultiplexing using one or more metamaterials in an optical communications systems are described. An optical device may be configured to shift one or more phase profiles of an optical signal using one or more stages of metamaterials to multiplex or demultiplex wavelengths of optical signals. The optical device may be an example of a stacked design with two or more stages of metamaterials stacked on top of one another. The optical device may be an example of a folded design that reflects optical signals between different stages of metamaterials.

24 Claims, 11 Drawing Sheets

(56) References Cited

U.S. PATENT DOCUMENTS

| | | | |
|---|---|---|---|
| 10,324,286 | B2 | 6/2019 | Morizur et al. |
| 11,092,486 | B2* | 8/2021 | Faraji-Dana .......... G01J 3/0224 |
| 11,187,582 | B2* | 11/2021 | Faraji-Dana .............. G01J 3/24 |
| 2002/0118915 | A1* | 8/2002 | Sagan ................ G02B 6/29367 |
| | | | 385/24 |
| 2016/0327746 | A1* | 11/2016 | Mathai ................ G02B 6/2938 |
| 2017/0030773 | A1 | 2/2017 | Han et al. |
| 2018/0052284 | A1 | 2/2018 | Matres et al. |
| 2018/0076376 | A1 | 3/2018 | Brady et al. |
| 2019/0033683 | A1* | 1/2019 | Ahmed ................... C23C 16/24 |
| 2019/0178714 | A1* | 6/2019 | Faraji-Dana .......... G02B 5/1847 |
| 2019/0219739 | A1 | 7/2019 | Gregorski et al. |
| 2023/0054228 | A1* | 2/2023 | Capasso .............. H04J 14/0209 |
| 2023/0085821 | A1* | 3/2023 | Capasso ................. G02B 1/002 |
| 2023/0088292 | A1* | 3/2023 | Capasso ................. G02B 1/002 |

OTHER PUBLICATIONS

Giles, M. B. et al., "Introduction to the Adjoint Approach to Design", Flow, Turbulence and Combustion, vol. 65, 2000, pp. 393-415; 10.1023/A:1011430410075 (2000).

H. Ishio, et al., "Review and status of wavelength-division-multiplexing technology and its application," in Journal of Lightwave Technology, vol. 2, No. 4, 1984, pp. 448-463.

Hashimoto, T., et al., "Optical circuit design based on a wavefront-matching method", Optics Letters, 2005, vol. 30, No. 19, pp. 2620-2622.

Lalau-Keraly, et al., "Adjoint shape optimization applied to electromagnetic design", Optics express, vol. 21, 2013, pp. 21693-21701; 10.1364/OE.21.021693.

Lin, Z., et al., "Enhanced Spontaneous Emission at Third-Order Dirac Exceptional Points in Inverse-Designed Photonic Crystals", Physical review letters, vol. 117, 107402, 2016, pp. 1-7; 10.1103/PhysRevLett.117.107402 (2016).

M. Faraji-Dana et al., "Compact folded metasurface spectrometer" Nature communications 9, 4196 (2018).

Michaels, A. et al., "Inverse design of near unity efficiency perfectly vertical grating couplers", Optics express, vol. 26, 2018, pp. 4766-4779; 10.1364/OE.26.004766.

Molesky, S. et al. "Inverse design in nanophotonics". Nature Photon 12, 659-670; 10.1038/s41566-018-0246-9 (2018).

Sawada, Y., et al., "Development of the Wavefront Matching Method Based on the 3-D Finite-Element Method and Its Application to Si-wire Mode Converters", J. Lightwave Technol., vol. 36, 2018, pp. 3652-3659; 10.1109/JLT.2018.2843383.

Y. Sakamaki, et al., "New Optical Waveguide Design Based on Wavefront Matching Method," Journal of Lightwave Technology, vol. 25, No. 11, pp. 3511-3518 (2007).

Yamashita, Y. et al., "Design and Fabrication of Broadband PLC-Based Two-Mode Multi/Demultiplexer Using a Wavefront Matching Method", J. Lightwave Technol. vol. 35, 2017, pp. 2252-2258; 10.1109/JLT.2016.2641461.

Yi Zhou, et al., "Design of optical wavelength demultiplexer based on off-axis meta-lens," Opt. Lett. 42, 4716-4719 (2017).

Yu, N., et al., "Flat optics with designer metasurfaces", Nature Materials, vol. 13, No. 2, 2014, pp. 139-150.

Yuebian Zhang, et al., "Spin-Selective and Wavelength-Selective Demultiplexing Based on Waveguide-Integrated All-Dielectric Metasurfaces", Advanced Optical Materials, vol. 7, Issue 6, 2019.

International Search Report and Written Opinion of the International Searching Authority; PCT/US2021/015918 Mailed on May 21, 2021, 11 pages; European Patent Office.

Kruk et al., "Dielectric Metasurfaces for Optical Communications and Spatial Division Multiplexing", CLEO , OSA , May 13, 2018, p. 1~2.

Taiwanese Patent Application No. 110103531, Office Action dated Sep. 16, 2024, 4 pages (English Translation only), Taiwanese Patent Office.

* cited by examiner

WAVELENGTH MULTIPLEXER/DEMULTIPLEXER USING METAMATERIALS FOR OPTICAL FIBER COMMUNICATIONS

CROSS-REFERENCE TO RELATED APPLICATIONS

This application claims the benefit of priority under 35 U.S.C. § 371 of International Application No. PCT/US2021/015918, filed on Jan. 29, 2021, which claims the benefit of priority under 35 U.S.C. § 119 of U.S. Provisional Application Ser. No. 62/968,531 filed on Jan. 31, 2020, the content of which is relied upon and incorporated herein by reference in its entirety.

BACKGROUND

The following relates generally to one or more optical communication systems and more specifically to a wavelength multiplexer or demultiplexer that uses metamaterials for optical fiber communications.

Optical communications systems are widely deployed to provide various types of communication content such as voice content, video content, packet data, messaging, broadcast content, and so on. Optical communication systems rely on various types of adjusting of optical signals onto a common transmission optical fiber to increase the amount of information that can be transmitted over the transmission optical fiber.

SUMMARY

The systems, methods, and devices of this disclosure each have several new and innovative aspects. This summary provides some examples of these new and innovative aspects, but the disclosure may include new and innovative aspects not included in this summary.

An apparatus may include a first substrate that is optically transmissive, a first stage of metamaterials positioned in proximity to or in contact with the first substrate, a second stage of metamaterials positioned in proximity to or in contact with the first substrate, a reflector positioned opposite the first substrate and configured to reflect an optical signal that passes through the first stage of metamaterials to pass through the first stage of metamaterials again, and where the first stage of metamaterials and the second stage of metamaterials are configured to multiplex a first optical signal having a first wavelength and a second optical signal having a second wavelength into a third optical signal having the first wavelength and the second wavelength based on shifting a first phase profile of the first optical signal and a second phase profile of the second optical signal by the first stage of metamaterials and the second stage of metamaterials.

In some examples, the first stage of metamaterials may be configured to shift the first phase profile of the first optical signal and the second phase profile of the second optical signal and output a first shifted optical signal and a second shifted optical signal, and the second stage of metamaterials may be configured to shift a third phase profile of the first shifted optical signal and a fourth phase profile of the second shifted optical signal and output the third optical signal that includes the first wavelength and the second wavelength.

Some examples of the apparatus may include cladding positioned between the first stage of metamaterials and the reflector, the cladding having a thickness configured to mitigate losses of optical signals interacting with the first stage of metamaterials, or to protect the first stage of metamaterials, or a combination thereof.

In some examples, the thickness of the cladding may be between 500 nanometers and 2 micrometers.

Some examples of the apparatus may include a first reflector and a second reflector configured to reflect the first optical signal and the second optical signal, the first substrate positioned between the first reflector and the second reflector.

In some examples, the first stage of metamaterials and the second stage of metamaterials may be positioned in proximity to or in contact with the first reflector.

In some examples, the first stage of metamaterials may be positioned in proximity to or in contact with the first reflector, and the second stage of metamaterials may be positioned in proximity to or in contact with the second reflector.

In some examples, the first reflector forms a first aperture for receiving the first optical signal and the second optical signal, and the second reflector forms a second aperture for outputting the third optical signal.

In some examples, the first reflector forms a first aperture for receiving the first optical signal and the second optical signal and forms a second aperture for outputting the third optical signal.

In some examples, the first substrate, the first reflector, the second reflector, the first stage of metamaterials, and the second stage of materials form a Fabry-Perot cavity configured to generate one or more resonant reflections of the first optical signal and the second optical signal.

In some examples, the first stage of metamaterials may include operations, features, means, or instructions for a set of metamaterial structures arranged in a pattern to shift a phase profile of the optical signal based on one or more parameters of each metamaterial structure of the set of metamaterial structures.

In some examples, the one or more parameters of the metamaterial structure includes a height of the metamaterial structure, a cross-sectional profile of the metamaterial structure, a diameter of the metamaterial structure, a dielectric property of the metamaterial structure, or a combination thereof, and where at least one of the one or more parameters of the metamaterial structure may be different for a first metamaterials structure compared to a second metamaterial structure.

In some examples, a total phase shifting caused by the first stage of metamaterials may be based on a phase shifting profile of each metamaterial structure and the pattern of the set of metamaterial structures.

An apparatus may include a substrate that is optically transmissive, a stage of metamaterials positioned in proximity to or in contact with the substrate, a reflector positioned opposite the substrate and configured to reflect an optical signal that passes through the stage of metamaterials to pass through the stage of metamaterials again and where the stage of metamaterials is configured to demultiplex a first optical signal having a first wavelength and a second wavelength into a second optical signal having the first wavelength and a third optical signal having the second wavelength based on shifting a phase profile of the first optical signal by the stage of metamaterials before and after the first optical signal reflects from the reflector, the second optical signal having a first portion of information conveyed by the first optical signal and the third optical signal having a second portion of information conveyed by the first optical signal.

A method may include growing a substrate that is optically transmissive, depositing a layer of metamaterial on the substrate, depositing a resist layer on the layer of metamaterial, etching a portion of the resist layer to form a set of hardmasks, and etching the set of hardmasks and exposed portions of the layer of metamaterial to form a set of metamaterial structures based on etching the portion of the resist layer, where the set of metamaterial structures are configured to shift phase profiles of a first optical signal having a first wavelength and a second optical signal having a second wavelength to multiplex the first optical signal and the second optical signal into a third optical signal having the first wavelength and the second wavelength.

An apparatus may include a processor, memory in electronic communication with the processor, and instructions stored in the memory. The instructions may be executable by the processor to cause the apparatus to grow a substrate that is optically transmissive, deposit a layer of metamaterial on the substrate, deposit a resist layer on the layer of metamaterial, etch a portion of the resist layer to form a set of hardmasks, and etch the set of hardmasks and exposed portions of the layer of metamaterial to form a set of metamaterial structures based on etching the portion of the resist layer, where the set of metamaterial structures are configured to shift phase profiles of a first optical signal having a first wavelength and a second optical signal having a second wavelength to multiplex the first optical signal and the second optical signal into a third optical signal having the first wavelength and the second wavelength.

Another apparatus may include means for growing a substrate that is optically transmissive, means for depositing a layer of metamaterial on the substrate, means for depositing a resist layer on the layer of metamaterial, means for etching a portion of the resist layer to form a set of hardmasks, and means for etching the set of hardmasks and exposed portions of the layer of metamaterial to form a set of metamaterial structures based on etching the portion of the resist layer, where the set of metamaterial structures are configured to shift phase profiles of a first optical signal having a first wavelength and a second optical signal having a second wavelength to multiplex the first optical signal and the second optical signal into a third optical signal having the first wavelength and the second wavelength.

A non-transitory computer-readable medium storing code is described. The code may include instructions executable by a processor to grow a substrate that is optically transmissive, deposit a layer of metamaterial on the substrate, deposit a resist layer on the layer of metamaterial, etch a portion of the resist layer to form a set of hardmasks, and etch the set of hardmasks and exposed portions of the layer of metamaterial to form a set of metamaterial structures based on etching the portion of the resist layer, where the set of metamaterial structures are configured to shift phase profiles of a first optical signal having a first wavelength and a second optical signal having a second wavelength to multiplex the first optical signal and the second optical signal into a third optical signal having the first wavelength and the second wavelength.

Some examples of the method, apparatuses, and non-transitory computer-readable medium described herein may further include operations, features, means, or instructions for depositing a reflective material to form a reflector at one end of the set of metamaterial structures based on etching the set of hardmasks and the exposed portions of the layer of metamaterial.

Some examples of the method, apparatuses, and non-transitory computer-readable medium described herein may further include operations, features, means, or instructions for depositing cladding on the set of metamaterial structures and on exposed portions of the substrate based on etching the set of hardmasks and the exposed portions of the layer of metamaterial, where depositing the reflective material may be based on depositing the cladding.

In some examples of the method, apparatuses, and non-transitory computer-readable medium described herein, the reflective material may be deposited on the cladding that may be positioned between the set of metamaterial structures and the reflective material.

In some examples of the method, apparatuses, and non-transitory computer-readable medium described herein, the reflective material may be deposited on the cladding that may be positioned between the set of metamaterial structures and the reflective material.

Some examples of the method, apparatuses, and non-transitory computer-readable medium described herein may further include operations, features, means, or instructions for depositing cladding on the set of metamaterial structures and on exposed portions of the substrate based on etching the layer of metamaterial and the resist layer, where depositing the reflective material may be based on depositing the cladding.

In some examples of the method, apparatuses, and non-transitory computer-readable medium described herein, each metamaterial structure of the set of metamaterial structures may have one or more parameters that includes a height of the metamaterial structure, a cross-sectional profile of the metamaterial structure, a diameter of the metamaterial structure, a dielectric property of the metamaterial structure, or a combination thereof.

In some examples of the method, apparatuses, and non-transitory computer-readable medium described herein, at least some of the one or more parameters of each metamaterial structure may be based on a second cross-sectional profile of an associated hardmask.

In some examples of the method, apparatuses, and non-transitory computer-readable medium described herein, at least some of the one or more parameters of each metamaterial structure may be based on a second cross-sectional profile of an associated cavity in the resist layer.

A method may include depositing a substrate that is optically transmissive, depositing a resist layer on the substrate, etching a portion of the resist layer to form a set of cavities in the resist layer, depositing a layer of metamaterial on the resist layer that forms the set of cavities, the layer of metamaterial filling at least some of the set of cavities formed in the resist layer, and etching the layer of metamaterial and the resist layer to form a set of metamaterial structures based on depositing the layer of metamaterial on the resist layer, where the set of metamaterial structures are configured to shift phase profiles of a first optical signal having a first wavelength and a second optical signal having a second wavelength to multiplex the first optical signal and the second optical signal into a third optical signal having the first wavelength and the second wavelength.

An apparatus may include a processor, memory in electronic communication with the processor, and instructions stored in the memory. The instructions may be executable by the processor to cause the apparatus to deposit a substrate that is optically transmissive, deposit a resist layer on the substrate, etch a portion of the resist layer to form a set of cavities in the resist layer, deposit a layer of metamaterial on the resist layer that forms the set of cavities, the layer of metamaterial filling at least some of the set of cavities formed in the resist layer, and etch the layer of metamaterial and the resist layer to form a set of metamaterial structures based on depositing the layer of metamaterial on the resist layer, where the set of metamaterial structures are configured to shift phase profiles of a first optical signal having a first wavelength and a second optical signal having a second wavelength to multiplex the first optical signal and the second optical signal into a third optical signal having the first wavelength and the second wavelength.

Another apparatus may include means for depositing a substrate that is optically transmissive, means for depositing a resist layer on the substrate, means for etching a portion of the resist layer to form a set of cavities in the resist layer, means for depositing a layer of metamaterial on the resist layer that forms the set of cavities, the layer of metamaterial filling at least some of the set of cavities formed in the resist layer, and means for etching the layer of metamaterial and the resist layer to form a set of metamaterial structures based on depositing the layer of metamaterial on the resist layer, where the set of metamaterial structures are configured to shift phase profiles of a first optical signal having a first wavelength and a second optical signal having a second wavelength to multiplex the first optical signal and the second optical signal into a third optical signal having the first wavelength and the second wavelength.

A non-transitory computer-readable medium storing code is described. The code may include instructions executable by a processor to deposit a substrate that is optically transmissive, deposit a resist layer on the substrate, etch a portion of the resist layer to form a set of cavities in the resist layer, deposit a layer of metamaterial on the resist layer that forms the set of cavities, the layer of metamaterial filling at least some of the set of cavities formed in the resist layer, and etch the layer of metamaterial and the resist layer to form a set of metamaterial structures based on depositing the layer of metamaterial on the resist layer, where the set of metamaterial structures are configured to shift phase profiles of a first optical signal having a first wavelength and a second optical signal having a second wavelength to multiplex the first optical signal and the second optical signal into a third optical signal having the first wavelength and the second wavelength.

Some examples of the method, apparatuses, and non-transitory computer-readable medium described herein may further include operations, features, means, or instructions for depositing a reflective material to form a reflector at one end of the set of metamaterial structures based on etching the layer of metamaterial and the resist layer.

In some examples of the method, apparatuses, and non-transitory computer-readable medium described herein, each metamaterial structure of the set of metamaterial structures may have one or more parameters of the metamaterial structure includes a height of the metamaterial structure, a cross-sectional profile of the metamaterial structure, a diameter of the metamaterial structure, a dielectric property of the metamaterial structure, or a combination thereof.

An apparatus may include a first substrate that is optically transmissive, a first stage of metamaterials positioned in proximity to or in contact with the first substrate, a second stage of metamaterials positioned in proximity to or in contact with the first substrate, the first stage of metamaterials and the second stage of metamaterials configured multiplex a first optical signal having a first wavelength and a second optical signal having a second wavelength into a third optical signal having the first wavelength and the second wavelength based on shifting a first phase profile of the first optical signal and a second phase profile of the second optical signal by the first stage of metamaterials and the second stage of metamaterials.

In some examples, the first stage of metamaterials may be configured to shift the first phase profile of the first optical signal and the second phase profile of the second optical signal and output a first shifted optical signal and a second shifted optical signal, and the second stage of metamaterials may be configured to shift a third phase profile of the first shifted optical signal and a fourth phase profile of the second shifted optical signal and output the third optical signal and the fourth optical signal.

Some examples of the apparatus may include a second substrate that may be optically transmissive positioned in proximity to or in contact with the second stage of metamaterials, where the first substrate, the first stage of metamaterials, the second substrate, and the second stage of metamaterials form a stacked structure.

Some examples of the apparatus may include a spacer positioned in proximity to or in contact with the first substrate and the second substrate and creating a space between a first surface of the first substrate and a second surface of the second substrate, where the second stage of metamaterials may be positioned in the space created by the spacer.

Some examples of the apparatus may include a liquid optically clear adhesive positioned in the space created by the spacer, where the second stage of metamaterials may be positioned in proximity to or in contact with the second surface of the second substrate and the liquid optically clear adhesive may be positioned between the second stage of metamaterials and the first surface of the first substrate.

Some examples of the apparatus may include a first reflector and a second reflector configured to reflect the first optical signal and the second optical signal, the first substrate positioned between the first reflector and the second reflector.

Some examples of the apparatus may include cladding positioned between the first stage of metamaterials and the first reflector, the cladding having a thickness configured to mitigate losses of optical signals interacting with the first stage of metamaterials or to protect the first stage of metamaterials or a combination thereof.

In some examples, the first stage of metamaterials and the second stage of metamaterials may be positioned in proximity to or in contact with the first reflector; or the first stage of metamaterials may be positioned in proximity to or in contact with the first reflector and the second stage of metamaterials may be positioned in proximity to or in contact with the second reflector.

In some examples, the first reflector forms a first aperture for receiving the first optical signal and the second optical signal, and the second reflector forms a second aperture for outputting the third optical signal; or the first reflector forms the first aperture for receiving the first optical signal and the second optical signal and the second aperture for outputting the third optical signal.

In some examples, the first substrate, the first reflector, the second reflector, the first stage of metamaterials, and the second stage of metamaterials form a Fabry-Perot cavity configured to generate one or more resonant reflections of the first optical signal and the second optical signal.

In some examples, the first stage of metamaterials may include operations, features, means, or instructions for a set of metamaterial structures arranged in a pattern to shift a phase profile of an optical signal based on one or more parameters of each metamaterial structure of the set of metamaterial structures.

In some examples, the one or more parameters of the metamaterial structure includes a height of the metamaterial structure, a cross-sectional profile of the metamaterial structure, a diameter of the metamaterial structure, a dielectric property of the metamaterial structure, or a combination thereof.

In some examples, a total phase shifting caused by the first stage of metamaterials may be based on a phase shifting profile of each metamaterial structure and the pattern of the set of metamaterial structures.

An apparatus may include a substrate that is optically transmissive, a stage of metamaterials positioned in proximity to or in contact with the substrate and configured to demultiplex a first optical signal having a first wavelength and a second wavelength into a second optical signal having the first wavelength and a third optical signal having the second wavelength based on shifting a phase profile of the first optical signal by the stage of metamaterials before and after the first optical signal reflects from the reflector, the second optical signal having a first portion of information conveyed by the first optical signal and the third optical signal having a second portion of information conveyed by the first optical signal.

DETAILED DESCRIPTION

Optical communications systems are widely deployed to provide various types of communication content such as voice content, video content, packet data, messaging, broadcast content, and so on. Optical communication systems rely on various types of multiplexing of optical signals onto a common transmission optical fiber to increase the amount of information that can be transmitted over the transmission optical fiber. Some types of multiplexing may include wavelength division multiplexing (WDM), polarization division multiplexing (PDM), frequency division multiplexing (FDM), time division multiplexing (TDM), space division multiplexing (SDM), and mode division multiplexing (MDM).

WDM techniques can be used in both short-distance optical communication systems (e.g., for connections within data centers) and long-haul optical communication systems (e.g., for inter-data center connections, metropolitan environments, submarine environments such as a transcontinental optical communication link). By using multiple optical signals at different wavelengths, the communication capacity of an optical communication link can be effectively increased. In such optical systems, a wavelength multiplexer and wavelength demultiplexer may be used to perform WDM techniques. For example, a multiplexer may combine optical signals having different wavelengths from different input fibers into one output fiber, and a demultiplexer may separate an optical signal that has multiple different wavelengths from one or more input fiber into different output fibers.

Systems, devices, and techniques for performing wavelength division multiplexing or demultiplexing using one or more metamaterials in optical communications systems are described. An optical device may be configured to shift one or more phase profiles of an optical signal using one or more stages of metamaterials to multiplex or demultiplex respective wavelengths of optical signals. The optical device may be an example of a stacked design with two or more stages of metamaterials stacked on top of one another. The optical device may be an example of a folded design that reflects optical signals between different stages of metamaterials.

Features of the disclosure are initially described in the context of an optical system as described with reference to FIG. 1A. Features of the disclosure are further described in the context of optical devices, a phase profile, and flowcharts, as described with reference to FIGS. 2A-8.

Figure 1A:
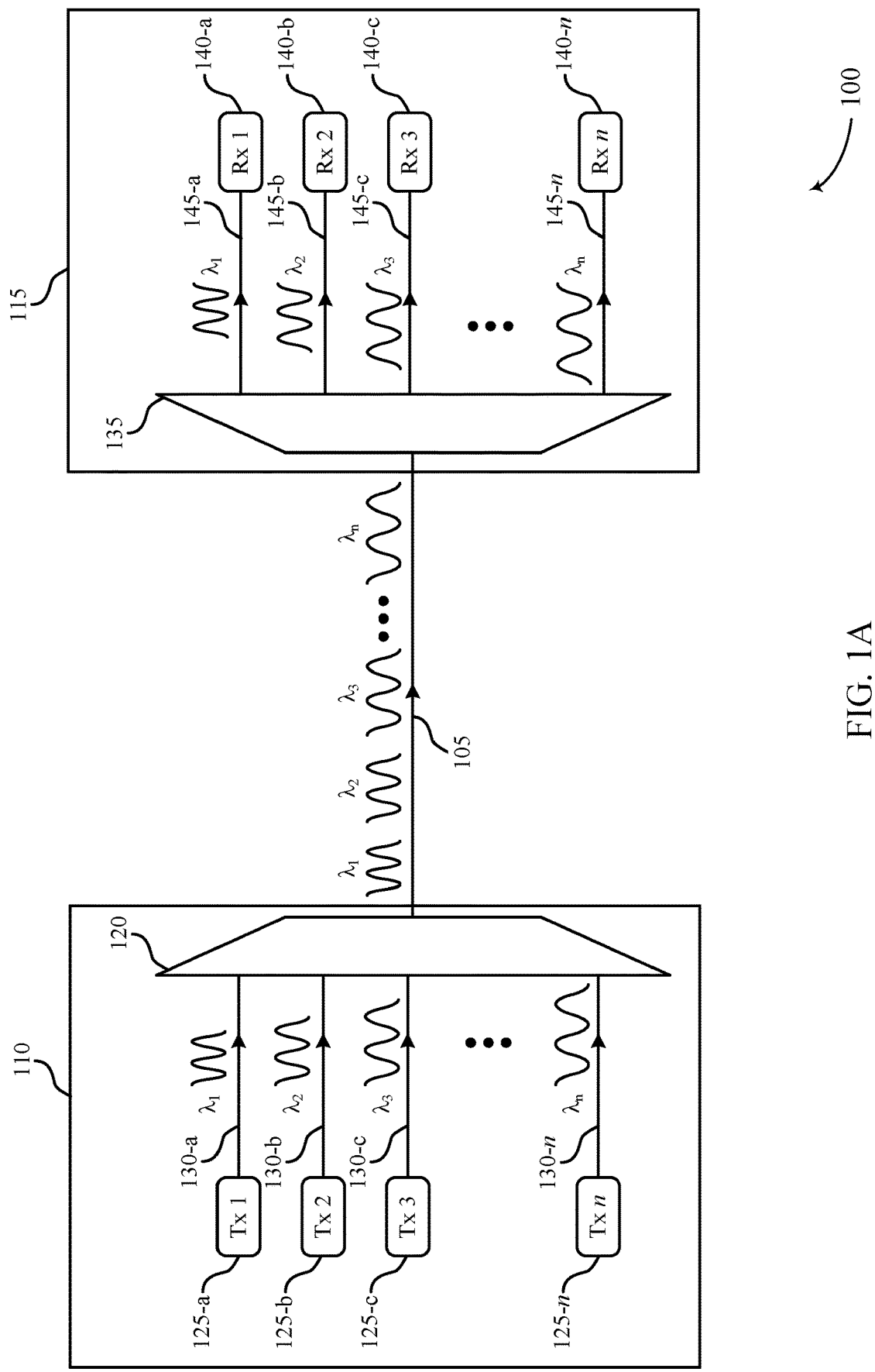
FIG. 1A illustrates an example of a schematic diagram of an optical system that supports a wavelength multiplexer or demultiplexer that uses metamaterials for optical fiber communications in accordance with examples as disclosed herein.

FIG. 1A illustrates an example of a schematic diagram of an optical system 100 that supports a wavelength multiplexer or demultiplexer that uses metamaterials for optical fiber communications in accordance with examples as disclosed herein. The optical system 100 may include an optical communications link 105, a transmitter system 110, and a receiver system 115.

The optical system 100 may utilize techniques of WDM to increase an amount of information communicated over a single optical communications link 105. WDM techniques may include multiplexing a quantity of optical carrier signals having different wavelengths onto fewer optical fibers or onto a single optical fiber. Such techniques may enable bidirectional communications over a single optical fiber or multiplication of capacity over a single optical fiber in some examples. In effect, WDM may combine two or more optical signals operating in different optical frequency bands into a single optical signal communicated over an optical fiber. WDM techniques may also include demultiplexing techniques that demultiplex an optical signal, such as a single optical signal, with different information in different optical frequency bands into more optical signals, such as two or more optical signals. WDM techniques may increase a communication capacity of an optical communications link 105.

The optical communications link 105 may be an example of an optical fiber for communicating one or more optical signals. An optical fiber may convey light from one end to another end by guiding the light through principles of internal reflection. One or more optical signals conveyed by the optical communications link 105 may be modulated with information to support communications between the transmitter system 110 and the receiver system 115. The optical communications link 105 may include one or more multi-mode fibers (MMFs), one or more few-mode fibers (FMFs), one or more single-mode fiber (SMFs), one or more multi-core fibers (MCFs), or any combination thereof.

The transmitter system 110 may be configured to transmit an optical signal through the optical communications link 105. The transmitter system 110 may include a multiplexer 120 and one or more transmitters 125 that may be coupled using one or more optical communication links 130. The optical communications link 130 may include SMFs, FMFs, MMFs, MCFs, or any combination thereof. The transmitters 125 may be configured to transmit an optical signal that includes optical energy operating at an optical wavelength (e.g., optical frequency band) and modulated with information. In some cases, each transmitter 125 may be configured to transmit an optical signal that operates at a unique optical wavelength. For example, a first transmitter 125-*a* may be configured to transmit a first optical signal at a first wavelength (e.g., $\lambda_1$) and a second transmitter 125-*b* may be configured to transmit a second optical signal at second wavelength (e.g., $\lambda_2$) different than the first wavelength. The transmitter system 110 may be an example of a system implemented at a central office (CO), a headend, a switching center, or the like. In other examples, the transmitter system 110 may be implemented at a consumer premises equipment (CPE) or other device.

The multiplexer 120 may be configured to multiplex several optical signals together into a single optical signal. The multiplexer 120 may receive one or more optical signals from the transmitters 125 (e.g., over the one or more optical communication links 130) and may output one or more optical signals over the optical communications link 105. The multiplexer 120 may be configured to implement WDM techniques to combine different wavelengths from different optical signals into fewer optical signals, such as a single optical signal that includes the different wavelengths.

The receiver system 115 may be configured to receive an optical signal conveyed by the optical communications link 105. The receiver system 115 may include a demultiplexer 135 and one or more receivers 140, where the one or more receivers 140 may be coupled with the demultiplexer 135 using one or more optical communication links 145. The optical communications link 145 may include SMFs, FMFs, MMFs, MCFs, or any combination thereof. The demultiplexer 135 may be configured to receive one or more optical signals, such as a single optical signal, and split the optical signal(s) into several optical signals. In some examples, the demultiplexer 135 may receive an optical signal conveyed by the optical communications link 105 and may output one or more optical signals to the receivers 140 (e.g., over the one or more optical communication links 145). The demultiplexer 135 may be configured to implement WDM techniques to split different wavelengths from a single optical signal into different optical signals that include the different wavelengths.

The receivers 140 may be configured to receive an optical signal that includes optical energy operating at an optical wavelength (e.g., optical frequency band) and modulated with information. In some cases, each receiver 140 may be configured to receive an optical signal that operates at a unique optical wavelength. For example, a first receiver 140-*a* may be configured to receive a first optical signal at a first wavelength (e.g., $\lambda_1$) and a second receiver 140-*b* may be configured to receive a second optical signal at second wavelength (e.g., $\lambda_2$) different than the first wavelength. In some cases, the receiver system 115 may be an example of a system implemented at a CO, a headend, a switching center, or the like. In other examples, the receiver system 115 may be implemented at a CPE or similar device.

WDM techniques may be used in both short-distance optical communication systems (e.g., for connections within data centers) and long-haul optical communication systems (e.g., for inter-data center connections, metropolitan environments, submarine environments such as transcontinental optical communication link). By using multiple optical signals at different wavelengths, the communication capacity of an optical communications link 105 can be effectively increased. In such WDM systems, a wavelength multiplexer (e.g., mux) or wavelength demultiplexer (e.g., demux) or both may be used to perform WDM techniques. For example, the multiplexer 120 may combine optical signals having different wavelengths from different input fibers into one output fiber, and a demultiplexer 135 may separate an optical signal that has multiple different wavelengths from one input fiber into different output fibers. The fibers used in the optical system 100 may be examples of an SMF, an FMF, an MMF, or an MCF, or any combination thereof. In other examples, the multiplexer or demultiplexer may be used with MCFs to convert between different modes of different optical signal in different cores of an MCF.

Some optical systems may use one or more of several techniques to perform WDM techniques. Examples of devices that may implement WDM techniques may include a thin film filter (TFF), an arrayed waveguide grating (AWG), or a fused fiber optic coupler, among others.

TFF technology may use concatenated interference filters, each of which may be fabricated with a different set of dielectric coatings designed to pass a single wavelength and reflect all other wavelengths. By using a series of parts with different thin film coatings, a TFF device may be used to separate or combine different wavelengths. TFFs may work well for low channel counts, but have limitations at higher channel counts, for example, due to size and accumulated insertion losses. In some cases, a few parts each having different thin film coating designs may be used within a TFF mux or TFF demux device, hence the device may use a micro-optics level assembly. In some cases, TFF technology may not be suitable for narrow-band dense WDM applications. For instance, such TFF devices may require several hundred layers of coatings to create narrow-band filters that separate and isolate individual wavelengths. The yield of such filter may be limited due to errors induced by local film thickness variation and density alternation.

AWG technology may utilize interference effects to separate or combine wavelengths. In some AWG devices, incoming light may propagate through a free propagation region and enter a bundle of optical fibers or channel waveguides, which have different lengths and thus apply a different phase shift to the light in each fiber or waveguide. The light then traverses another free propagation region and interferes at the entries of the output, such that each output channel receives light of a certain wavelength. AWG technology may be suitable and cost-effective for high-channel-count applications, and may offer flexibility in selecting channel numbers and spacing. In some cases, the whole AWG device can be integrated on the same substrate. The performance of some AWG devices, however, may be sensitive to temperature. For example, if the temperature of an AWG device fluctuates, the channel wavelength will change according to the thermal coefficient of the material used. Therefore, temperature control or monitoring techniques (which results in extra power consumption) or athermal techniques (which may be achieved by compensation using different materials) are used to maintain performance.

A fused coupler (also known as Fused Biconical Taper (FBT) technology) may include two, parallel optical fibers that have been twisted, stretched, and fused together. The cores may be so close to each other that an evanescent wave may "leak" from one fiber core into the other fiber core, resulting in an exchange of energy. The amount of energy exchanged may be dependent upon the coupling strength (e.g., based on the distance between the two cores) and coupling length (e.g., interaction length). The energy exchange rate may also vary with wavelength. By adjusting the coupling strength and length, light from different wavelengths may be combined from different ports into an output port (WDM mux) or separated from one port into different output ports (WDM demux). However, since this technique uses coupling between fiber cores, the number of wavelength channels is typically limited to two (2).

Optical system 100 may support systems, devices, and techniques for performing wavelength division multiplexing or demultiplexing using one or more metamaterials. In some examples, metamaterials may be or may include metasurfaces. A device having metamaterials may use one or more phase masks (e.g., high-resolution phase masks) enabled by optical metamaterials to multiplex or demultiplex wavelengths of optical signals. The device may be an example of a stacked design with two or more stages of metamaterials on top of one another. The device may be an example of a folded design that reflects optical signals between different stages of metamaterials. The phase profiles of the stages of metamaterials in the device may be designed using adjoint optimization techniques, wavefront matching techniques, or any combination thereof, as described further herein.

Wavelength multiplexing and demultiplexing are useful functionalities in optical communication systems. The wavelength multiplexing and demultiplexing functionalities may be examples of functionalities where light propagating in an optical fiber containing multiple wavelengths may be demultiplexed into separate signals, each signal being subsequently included in individual output fibers (or vice-versa). Such functionalities may be useful in a wide range of communication applications, such as long-distance communications networks employing WDM, access networks where multiple wavelengths are used, for example, in downstream (e.g., from a CO to a CPE, such as in a fiber-to-the-premises (FTTP) architecture or other network architectures) and upstream transmission (e.g., from a CPE to a CO in the FTTP network architecture), as well as in data center applications. Each application may include different performance requirements leading to different specification parameters for wavelength multiplexing and demultiplexing functionalities, such as a number of wavelengths being multiplexed or demultiplexed, optical performance specifications (e.g., insertion loss, crosstalk, channel bandwidth, channel spacing, others, or any combination thereof), environmental conditions, cost requirements, or density requirements. In particular, density requirements related to including more optical signals in smaller volumes are becoming more and more important in some data center and some access applications.

A TFF device may be used to perform WDM techniques. In some cases, a TFF device, involving multiple micro-optics elements may have a relatively large size and may be difficult to integrate into systems with high-density requirements, such as in a data center. In some examples, emerging applications, such as fiber to the server architectures, may use a wavelength multiplexer or wavelength demultiplexer for hundreds of optical fibers, and devices with small form-factors may accordingly become useful in such applications. Multiplexers and demultiplexers that use metamaterials to perform WDM techniques may exhibit highly compact form-factors. For example, a 4-wavelength micro-optics multiplexer/demultiplexer may be 50 mm×25 mm×10 mm in size, whereas a metamaterial multiplexer/demultiplexer with relatively similar optical performance may be 1 mm×1 mm×0.5 mm in size. Such size differences may enable integration of the metamaterial device in an optical connector.

In addition to a reduced form-factor, a metamaterial-based multiplexer/demultiplexer may provide other advantages. In some examples, the metamaterial-based wavelength multiplexer/demultiplexer device may be designed to support multiple wavelength channels, may be either coarse WDM (CWDM) or dense WDM (DWDM), and may be used for either SMF, or FMF, MMF, or an MCF, or hybrid fiber systems. The metamaterial-based multiplexer/demultiplexer may be implemented through integrated optics on a single substrate, eliminating other micro-optics components, such as multiple thin-film blocks, multiple collimators and mirrors, as well as significantly simplifying the fabrication and assembly process. In some examples, using wavefront matching techniques, adjoint analysis techniques (e.g., adjoint analysis optimization), or any combination thereof to design precise and high-resolution phase maps of the metamaterials may enable more complex filter designs that are not feasible with other technologies (e.g., such as thin-film stacks). In some examples, metamaterials can be designed as polarization insensitive, so that a metamaterial-based multiplexer/demultiplexer will not interfere with polarization multiplexing. It is noted that the terms metamaterials and metasurfaces described herein may refer to materials that exhibit properties based on the structure (e.g., geometry, arrangement, size, shape, orientation, or the like) of the material itself, which may be configured for various purposes, applications, or technologies.

Figure 1B:
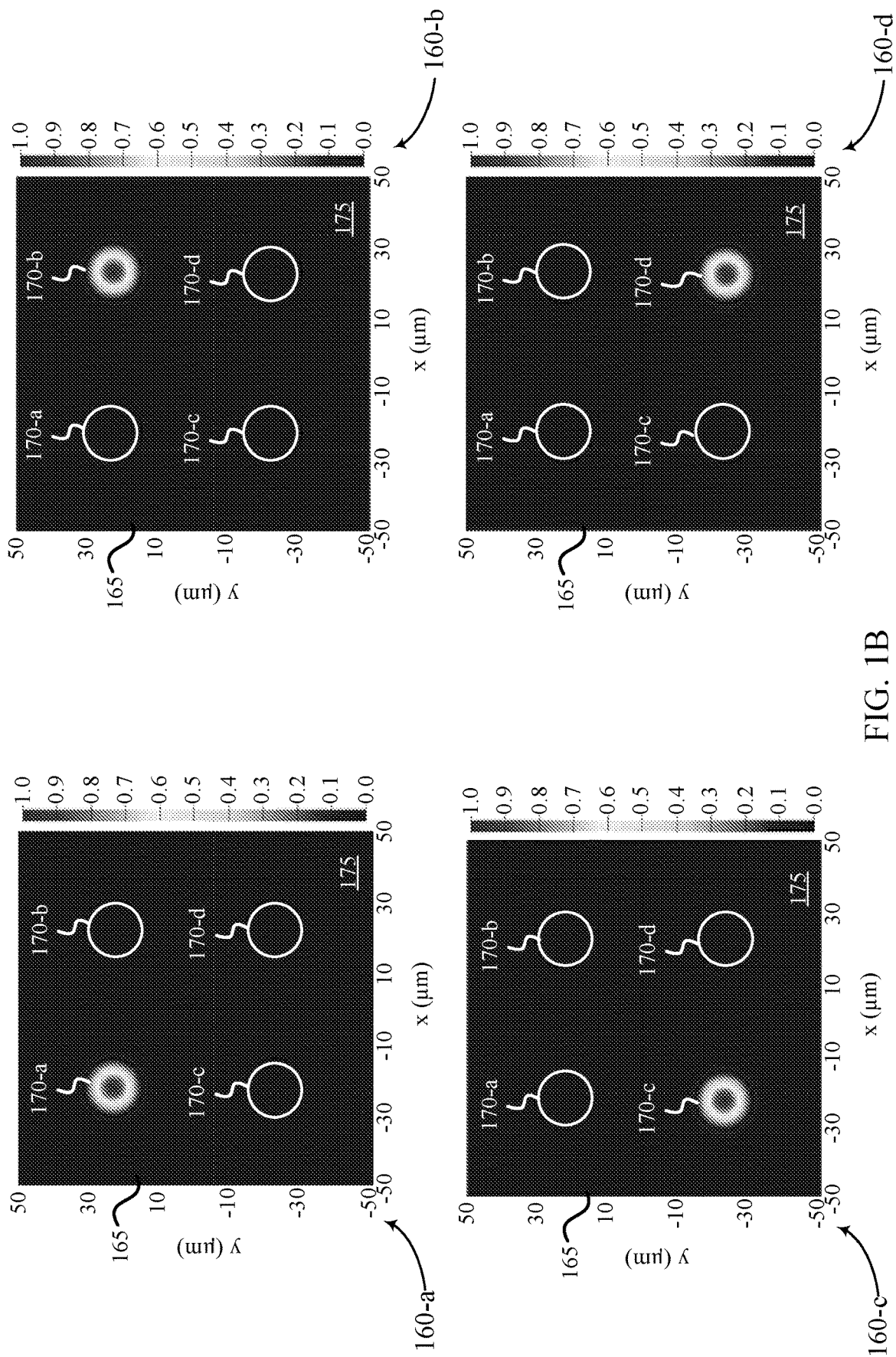
FIG. 1B illustrates examples of diagrams of an uncoupled multicore optical communication link that support a wavelength multiplexer or demultiplexer that uses metamaterials for optical fiber communications in accordance with examples as disclosed herein.

FIG. 1B illustrates examples of diagrams 160 of an uncoupled multicore optical communication link 165 that support a wavelength multiplexer or demultiplexer that uses metamaterials for optical fiber communications in accordance with examples as disclosed herein. The uncoupled multicore optical communication link 165 may be an example of the optical communication links 105, 130, and 145 as described with reference to FIG. 1A.

An MCF may be an example of an optical fiber that contains multiple cores in one common cladding. An MCF may include a plurality of SMFs, a plurality of FMFs, a plurality of MMFs, or any combination thereof. For example, the uncoupled multicore optical communication link 165 may include a first core 170-a, a second core 170-b, a third core 170-c, and a fourth core 170-d and a cladding 175 positioned in proximity to (e.g., near, proximate, without having one or more materials between, having one or more materials between) or in contact with each of the cores 170. The cores 170 of the uncoupled multicore optical communication link 165 may be examples of SMFs, FMFs, MMFs or any combination thereof. For cases, an MCF may include fibers have a single type (e.g., all SMFs) or may include fibers of different types (e.g., one SMF and three MMFs). With MCFs, the design of the cores, the number of cores, core layout, outer cladding thickness (e.g., a minimum distance between the center of the outer cores and the cladding-coating interface), a cladding diameter, or any combination thereof can be designed to achieve optical and mechanical performance for the MCF. Desirable fiber design may differ depending on the application. An MCF may include any quantity of cores (e.g., two, three, four, five, six, seven, eight, nine, ten, eleven, twelve, etc.).

An MCF may be an example of a coupled MCF or an uncoupled MCF. Some MCFs may experience issues related to inter-core crosstalk or other interference. An uncoupled MCF may be an MCF where each individual core is assumed to be an independent optical path. A coupled MCF may be an MCF where one core is assumed to be at least partially dependent on another core. In some examples, the distance between at least some cores in an uncoupled MCF may be greater than the distance between at least some cores in the coupled MCF.

The uncoupled multicore optical communication link 165 may be an example of an uncoupled MCF. In some cases, parameters of different cores 170 may be the same. In other examples, at least one core 170 of the plurality of cores 170 may have different parameters as the other cores. Examples of parameters of the cores 170 may include a diameter of the core, a dielectric property of the core, a relative difference between the dielectric property of the core 170 and a dielectric property of the cladding 175, a distance from a center of a core to a center of the uncoupled multicore optical communication link 165, a mode-rating of the core, a refractive index profile (e.g., $\Delta n$), or a combination thereof. In some examples, a diameter of each core 170 may be about 8.2 micrometers, a refractive index profile of the cores 170 may be about 0.35% (e.g., $\Delta n=0.35\%$), and a core center to center distance may be about 45 micrometers.

The first diagram 160-a may illustrate an intensity distribution of an optical signal in the first core 170-a, where the other cores (e.g., cores 170-b, 170-c, and 170-d) are not communicating optical signals. The second diagram 160-b may illustrate an intensity distribution of an optical signal in the second core 170-b, where the other cores (e.g., cores 170-a, 170-c, and 170-d) are not communicating optical signals. The third diagram 160-c may illustrate an intensity distribution of an optical signal in the third core 170-c, where the other cores (e.g., cores 170-a, 170-b, and 170-d) are not communicating optical signals. The fourth diagram 160-d may illustrate an intensity distribution of an optical signal in the fourth core 170-d, where the other cores (e.g., cores 170-a, 170-b, and 170-c) are not communicating optical signals.

Figure 1C:
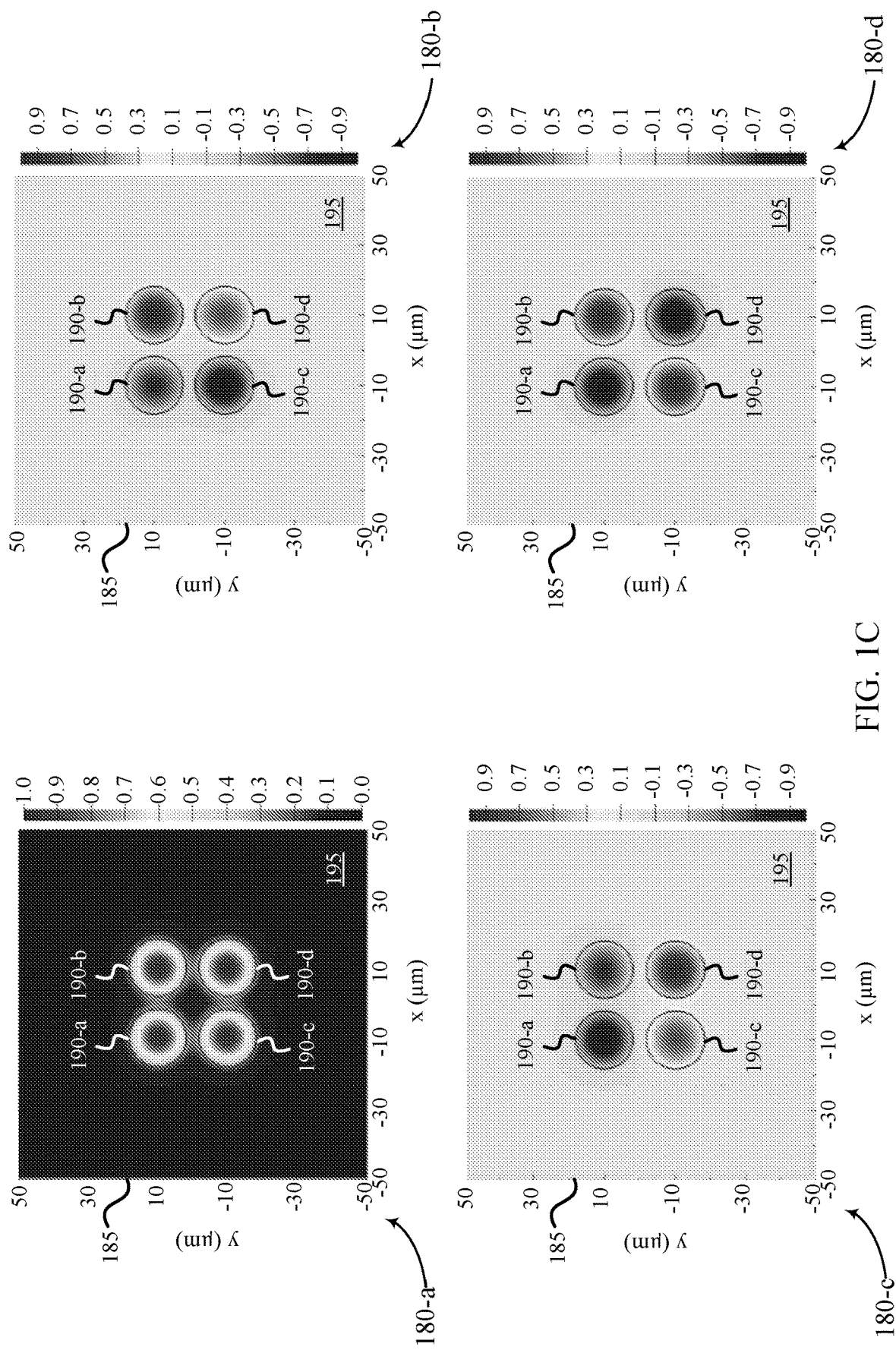
FIG. 1C illustrates examples of diagrams of a coupled multicore optical communication link that support a wavelength multiplexer or demultiplexer that uses metamaterials for optical fiber communications in accordance with examples as disclosed herein.

FIG. 1C illustrates examples of diagrams 180 of a coupled multicore optical communication link 185 that support a wavelength multiplexer or demultiplexer that uses metamaterials for optical fiber communications in accordance with examples as disclosed herein. The coupled multicore optical communication link 185 may be an example of the optical communication links 105, 130, and 145 as described with reference to FIG. 1A.

The coupled multicore optical communication link 185 may include a first core 190-a, a second core 190-b, a third core 190-c, and a fourth core 190-d and a cladding 195 positioned in proximity to or in contact with each of the cores 190. The cores 190 of the coupled multicore optical communication link 185 may be examples of SMFs, FMFs, MMFs or any combination thereof. For cases, an MCF may include fibers have a single type (e.g., all SMFs) or may include fibers of different types (e.g., one SMF and three MMFs).

The coupled multicore optical communication link 185 may be an example of a coupled MCF. In some cases, parameters of different cores 190 may be the same. In other examples, at least one core 190 of the plurality of cores 190 may have different parameters as the other cores. Examples of parameters of the cores 190 may include a diameter of the core, a dielectric property of the core, a relative difference between the dielectric property of the core 190 and a dielectric property of the cladding 195, a distance from a center of a core to a center of the coupled multicore optical communication link 185, a mode-rating of the core, a refractive index profile (e.g., $\Delta n$), or a combination thereof. In some examples, a diameter of each core 190 may be about 8.2 micrometers, a refractive index profile of the cores 170 may be about 0.35% (e.g., $\Delta n=0.35\%$), and a core center to center distance may be about 20 micrometers.

The diagrams 180 (e.g., a first diagram 180-a, a second diagram 180-b, a third diagram 180-c, and a fourth diagram 180-d) may illustrate different intensity distributions of optical signal in different cores 190. In the first diagram 180-a, the distributions in each of the cores 190 may be about the same. In the second diagram 180-b, the second core 190-b may have an intense distribution (e.g., around 0.9) at the center, the third core 190-b may have an intense distribution (e.g., around −0.9) at the center, the fourth core 190-d may have a medium distribution (e.g., around −0.5) at the center, and the first core 190-a may have a medium distribution (e.g., around 0.5) at the center. In the third diagram 180-c, the fourth core 190-d may have an intense distribution (e.g., around 0.9) at the center, the first core 190-a may have an intense distribution (e.g., around −0.9) at the center, the third core 190-c may have a medium distribution (e.g., around −0.5) at the center, and the second core 190-b may have a medium distribution (e.g., around 0.5) at the center. In the fourth diagram 180-d, the first core 190-a may have an intense distribution (e.g., around −0.9) at the center, the second core 190-b may have an intense distribution (e.g., around 0.9) at the center, the third core 190-c may have an intense distribution (e.g., around 0.9) at the center, and the fourth core 190-d may have an intense distribution (e.g., around −0.9) at the center.

Figure 2A:
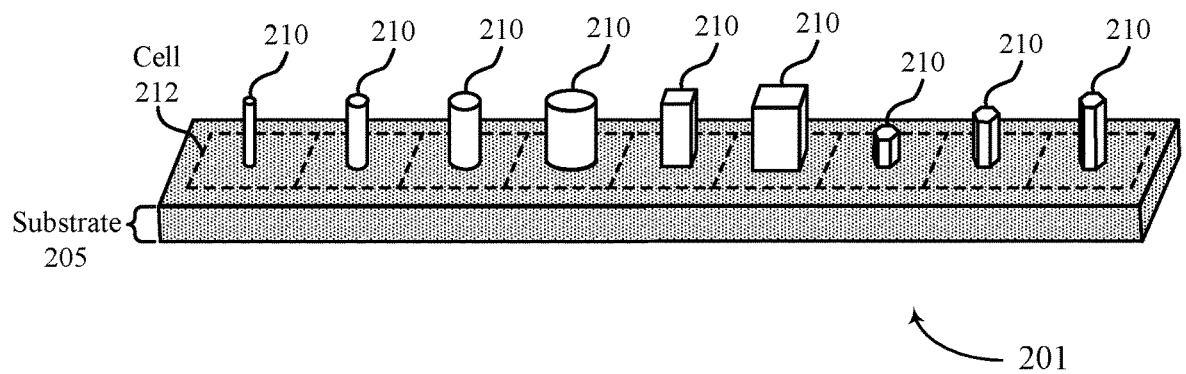
FIG. 2A illustrates an example of an optical device that may form at least a portion of a wavelength multiplexer or demultiplexer that uses metamaterials for optical fiber communications in accordance with examples as disclosed herein.

FIG. 2A illustrates an example of an optical device 201 that may form at least a portion of a wavelength multiplexer or demultiplexer that uses metamaterials for optical fiber communications in accordance with examples as disclosed herein. The optical device 201 may be an example of a multiplexer/demultiplexer device that uses metamaterials as described with reference to FIG. 1A. In some cases, the optical device 201 may be an example of a wavelength multiplexer/demultiplexer device.

The optical device 201 may include a substrate 205 and a plurality of metamaterial structures 210. In some cases, the optical device 201 may also include cladding (not shown). In some cases, the cladding may be air or some other environmental gas that surrounds the metamaterials. Metamaterials (sometimes referred to as metasurfaces) may be nanophotonic structures that may control the properties of light (e.g., a phase of light or a direction of travel of light) that passes through the metamaterials with a relatively high spatial resolution (e.g., sub-wavelength, on the order of hundreds nanometers depending on an operation wavelength window). In some examples, at least some if not each metamaterial structure 210 may have one or more parameters that affect how the properties of light are changed as the light passes through the metamaterial structure 210. An array of metamaterial structures 210 may be arranged in a pattern (thereby forming a stage of metamaterials) to produces a desired shift in the properties of an optical signal as it interacts with the stage of metamaterials.

In some cases, metamaterials may refer to a class of materials to have properties that may not be found in naturally occurring materials. An optical metamaterial may be smaller than the wavelength of light, but may be able to interact with light and affect the light. Examples of the interactions with light by metamaterials may include negative refraction, fast and slow light propagation in zero index, trapping structures, flat lenses, thin lenses, perfect lenses, or any combination thereof.

An individual metamaterial structure 210 may affect light passing through the metamaterial structure based on one or more properties of the metamaterial structure 210. Examples of the properties of the metamaterial structure 210 that may affect light may include a height of the metamaterial structure (e.g., a dimension of the metamaterial structure 210 that extends away from the substrate 205), a cross-sectional profile of the metamaterial structure 210 (e.g., a cross-sectional shape of the metamaterial), a cross-sectional area of the metamaterial structure 210, a volume of the metamaterial structure 210, a diameter of the metamaterial structure 210, a dielectric property of the metamaterial structure 210, a relative difference between the dielectric property of the metamaterial structure 210 and a dielectric property of the substrate 205, a relative difference between the dielectric property of the metamaterial structure 210 and a dielectric property of cladding, or any combination thereof. In some cases, a metamaterial structure 210 may be an example of a multi-level metamaterial structure, where a first metamaterial structure with a first set of parameters is stacked on top of a second metamaterial structure 210 with a second set of parameters. A multi-level metamaterial structure may include any quantity of metamaterial structures. In some cases, different metamaterial structures in a stack may have different dielectric properties or other properties.

The metamaterial structures 210 illustrated in FIG. 2A show examples of metamaterial structures having circular, rectangular, and hexagonal cross-sectional shapes, different cross-sectional areas, and different heights. These illustrative metamaterial structures 210 are merely examples of some of the properties of metamaterial structures. For example, in some cases, metamaterial structures 210 may have any cross-sectional profile, such as a circle, triangle, square, rectangle, pentagon, hexagon, other geometric cross-sectional profile, other shaped cross-sectional profile, or any combination thereof. As illustrated in FIG. 2A, each metamaterial structures 210 may correspond to a unit cell 212 of a set of unit cells for a stage of metamaterial structures. Additionally or alternatively, a unit cell 212 of a set of unit cells for a stage of metamaterial structures may include two or more metamaterial structures 210. In some examples, the metamaterial structures 210 may have one or more parameters that are the same and may be one or more parameters that are different. For example, in some case, all the metamaterials structures 210 may have a same cross-sectional area shape (e.g., circular shape), but may have a different cross-sectional area (e.g., different size, different diameter). For example, in some case, all the metamaterials structures 210 may have a same height (e.g., relative to the substrate), but may have a different cross-sectional area (e.g., different size, different diameter). In some examples, one or more parameters related to a set or a subset of the metamaterial structures 210 may be the same or may be different.

The substrate 205 may be an example of material that forms a supporting base for optical elements (such as metamaterials), other components, or any combination thereof. In some cases, the metamaterial structures 210 are coupled with the substrate 205. In some cases, the substrate 205 may be optically transmissive such that optical signals may pass through the substrate 205.

Each individual metamaterial structure 210 may be relatively small. To shift a phase profile of an optical signal, a plurality of metamaterial structures 210 may be arranged in a pattern and be configured to shift the phase profile of the optical signal. Arrays or patterns of metamaterial structures 210 may be referred to as stages of metamaterial structures. Each individual metamaterial structure 210 may be have its own set of parameters to affect the light. The overall phase-shifting profile of the stage of metamaterials may be based on the parameters of each individual metamaterial structure 210 in the stage. In some cases, cladding may be positioned in proximity to or in contact with the metamaterial structures 210, the substrate 205, or any combination thereof. The cladding may be configured to mitigate losses of optical signals interacting with the metamaterial structures 210 or to protect the metamaterial structures 210 from damage, or any combination thereof. In some cases, metamaterial structures 210 may be examples of reflective metamaterial structures and may be configured to be either achromatic or highly dispersive.

Each metamaterial structure 210 is illustrated as individual free-standing structures. In some examples, at least some or all of the metamaterial structures 210 may be formed of a single larger area. In such examples, a unit cell may refer to an individual configurable portion of the larger area of metamaterial that may be altered to achieve a desired phase profile.

Figure 2B:
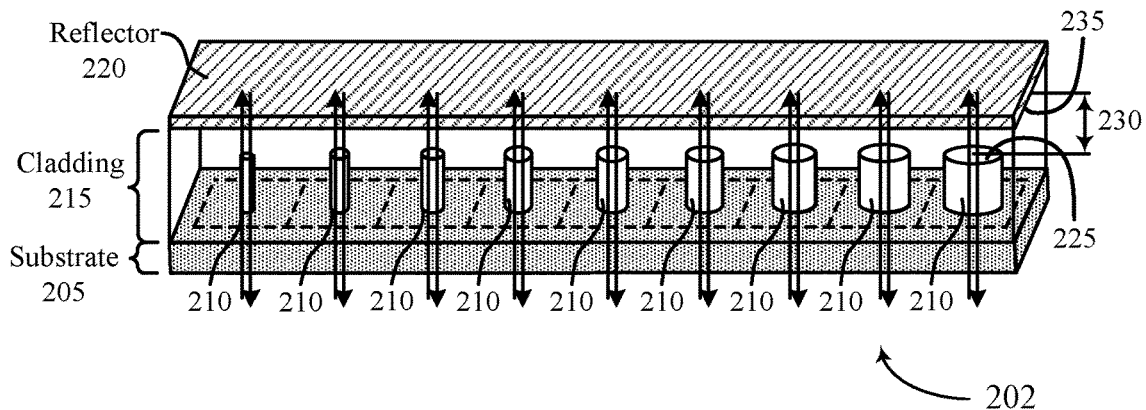
FIG. 2B illustrates an example of an optical device that may form at least a portion of a wavelength multiplexer or demultiplexer that uses metamaterials for optical fiber communications in accordance with examples as disclosed herein.

FIG. 2B illustrates an example of an optical device 202 that may form at least a portion of a wavelength multiplexer or demultiplexer that uses metamaterials for optical fiber communications in accordance with examples as disclosed herein. The optical device 202 may be an example of a multiplexer/demultiplexer device that uses metamaterials as described with reference to FIGS. 1A and 2A. In some cases, the optical device 202 may be an example of a wavelength multiplexer/demultiplexer device.

The optical device 202 may include a substrate 205, a plurality of metamaterial structures 210, cladding 215 surrounding the metamaterial structures 210, and a reflector 220. The optical device 202 may be an example of a stage of metamaterials that use a reflective design. In such designs, light may pass through the metamaterial structures 210, reflect off of the reflector 220, and pass through the metamaterial structures 210 again after being reflected. In such designs, the phase profile of a stage of metamaterials may be based on both the phase shift caused by the light first (e.g., initially) passing through the metamaterial structures 210 and on the phase shift caused by the reflected light passing through the metamaterial structures 210 again. The features of the substrate 205 and the metamaterial structures 210 are described with reference to FIG. 2A and are incorporated herein by reference.

The cladding 215 may be a layer of material. In some cases, the cladding 215 may have a lower refractive index than the metamaterial structures 210. In some cases, the cladding 215 may be configured to mitigate losses of optical signals interacting with the metamaterial structures 210. In some cases, the cladding 215 may be configured to protect the metamaterial structures 210 from damage.

In some examples, cladding 215 may be positioned between a surface 225 of a metamaterial structure 210 and the reflector 220. In such examples, a distance 230 may be formed between the surface 225 of the metamaterial structure 210 and a surface 235 of the reflector 220. The distance 230 may be configured to mitigate losses of optical signals passing through the metamaterial structures 210 and being reflected by the reflector 220. In some cases, the distance 230 may be about 500 nanometers. In some cases, the distance 230 may be between zero nanometers and a few micrometers (e.g., one, two, or three micrometers). The surface 225 of the metamaterial structure 210 may be positioned opposite a different surface of the metamaterial structure 210 that contacts the substrate 205.

The reflector 220 may be formed from one or more reflective materials. Examples of reflective materials may include gold or another metal. In some cases, the reflective material may be coated with another material to help to reflect the light. The light fields in FIG. 2B are illustrated as perpendicular to the metamaterials structures 210, substrate 205, cladding 215, and/or the reflector 220. In some examples, the light fields may arrive and/or leave at an angle that is not perpendicular with the metamaterials structures 210, substrate 205, cladding 215, and/or the reflector 220.

Each metamaterial structure 210 is illustrated as individual free-standing structures. In some examples, at least some or all of the metamaterial structures 210 may be formed of a single larger area. In such examples, a unit cell may refer to an individual configurable portion of the larger area of metamaterial that may be altered to achieve a desired phase profile.

Figure 2C:
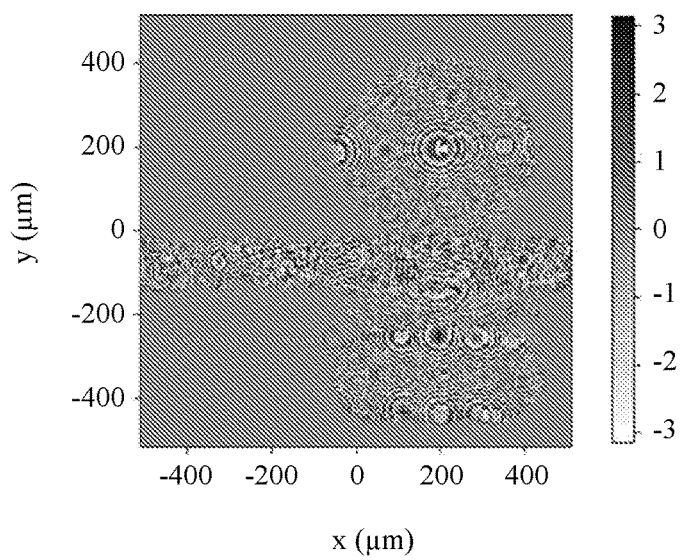
FIG. 2C illustrates an example of a phase profile of an optical device that supports a wavelength multiplexer or demultiplexer that uses metamaterials for optical fiber communications in accordance with examples as disclosed herein.

FIG. 2C illustrates an example of a phase profile 203 of an optical device that supports a wavelength multiplexer or demultiplexer that uses metamaterials for optical fiber communications in accordance with examples as disclosed herein. The shading of the phase profile 203 may show different phase shifts caused by different portions of an optical device (e.g., optical device 201 or 202). The phase profile 203 may be an example of a phase profile designed through wavefront matching techniques or adjoint analysis (e.g., adjoint optimization), as described herein.

A plurality of metamaterial structures may be arranged in a pattern and be configured to shift the phase profile of the optical signal. Arrays or patterns of metamaterial structures may be referred to as stages of metamaterial structures. Each metamaterial structure of a stage of metamaterials elements may be configured to shift a phase of a portion of an optical signal. In some cases, an individual metamaterial structure may be viewed as an individual pixel (or a unit cell) of a larger stage of metamaterials. In some cases, the dimensions of the metamaterial structures can be on the order of hundreds of nanometers depending on the operation wavelength window (e.g., when for a working wavelength of 1550 nm, the unit cell size may be 500 nm×500 nm). The overall phase shift performed by a stage of metamaterials may be based on the combination of each individual phase shift performed by each individual metamaterial structure of the stage of metamaterial structures. Stages of metamaterials may be designed with different phase profiles by altering the parameters of individual metamaterial structures in the stages of metamaterials. In some examples, light transmits through the substrate as well as the metamaterial structures (e.g., metamaterial pillars), and the phase change in each unit cell is determined by the geometry of the structure (e.g., cross-sectional profile, cross-sectional area, height, etc.).

The phase profile 203 is an example of phase profile caused by one or more stages of metamaterials. Stages of metamaterials may have different phase profiles based on the parameters of the various metamaterial structures that form the stage of metamaterials. In some cases, the wavelength-dependent behavior of the phase (or the dispersion) can be tuned, such that the metamaterial device may be either achromatic or relatively highly dispersive. In addition, metamaterial structures may be designed to work in reflection mode, when light passes through the pillars and reflects back with the help of one or more reflective materials, such as metal.

Depending on an operation wavelength window, different materials may be chosen for the substrate and the metamaterial structures. For example, for O band (1260-1360 nm), C band (1530-1565 nm), or L band (1565-1625 nm) windows, crystalline silicon, amorphous silicon, silicon nitride ($Si_3N_4$), and chalcogenide glasses can be used for the metamaterial structures. For shorter wavelength window (e.g., 850-940 nm), other materials such as titanium oxide ($TiO_2$) and silicon nitride ($Si_3N_4$) can used for the metamaterial structures. Transparent materials such as glass or polymer (e.g., SU8) may be used for the substrate and cladding.

In some cases, different design techniques may be used to design a phase profile of a stage of metamaterials. Examples of the design techniques may include wavefront matching, adjoint analysis (e.g., adjoint optimization), or any combination thereof.

To differentiate multiple wavelengths, a relatively highly dispersive system may be used. In some cases, a device may use different techniques (or any combination thereof) for creating such dispersion. First, each metamaterial structure itself may have dispersion (i.e., the phase value associated with each metamaterial structures at different wavelength may be different), which may be similar to material dispersion. Second, the propagation of light within the substrate may have dispersion (i.e., the propagation path and hence the propagation phase through the substrate at different wavelength may be different), which may be similar to grating dispersion. By selecting parameters of metamaterial structures in a stage of metamaterials, an optical device may achieve sufficient dispersion to make a compact and efficient WDM device.

Wavelength multiplexing and demultiplexing in fibers can be realized by utilizing a series of phase plates (e.g., stages of metamaterials) together with free space propagation to modify the wavefront of the light field. To achieve low-loss and loss-crosstalk wavelength multiplexing or wavelength demultiplexing, multiple stages of metamaterials may be used (whether in a stacked design or a folded design). The phase profiles for the stages of metamaterials used for wavelength multiplexing or wavelength demultiplexing can be designed by various methods including a wavefront matching method, adjoint analysis method (e.g., adjoint optimization method), or any combination thereof. In some cases, stages of metamaterials can be initialized with grating/lens features.

In a wavefront matching method, the input fields propagating forward may be compared with the target fields propagating backward to obtain the field difference at each stage of metamaterials. The difference may be compensated for by the design of the stage of materials phase plate, resulting in an accurate match of the fields. Such steps may be performed iteratively to arrive at a design. A stage of metamaterials may be designed with a phase profile that can yield low loss and low crosstalk performance of the device based on performing analysis using the wavefront matching method.

In an adjoint analysis (e.g., adjoint optimization), a figure of merit (FOM) of the design may be defined as the power throughput for each individual input and output pair. Given the FOM, the derivative of the FOM with respect to each design parameter can be calculated. In some cases, the derivative of the FOM may be calculated from the propagated fields at each metamaterial structure. Given the derivatives, an efficient gradient based nonlinear enhancement routine (e.g., a Conjugate Gradient (CG), Newton-CG, Sequential Least SQuares Programming (SLSQP), a Broyden-Fletcher-Goldfarb-Shanno (BFGS) algorithm, etc.) may be used to search for the enhanced phase profile. Depending on the application, additional FOMs can be added efficiently (e.g., when it can be written as an analytic expression of the design variables or the field variables). For example, to reduce the complexity of the phase mask, a FOM term that corresponds to the mean difference of phase values between every pair of adjacent pixels (or cells) may be added to the analysis. In other examples, instead of enhancing for the average loss for all the channels, the worst case (maximal) loss among all channels can be minimized or the loss according to a specific distribution, for example the channel bandwidths, can be enhanced.

Figure 3:
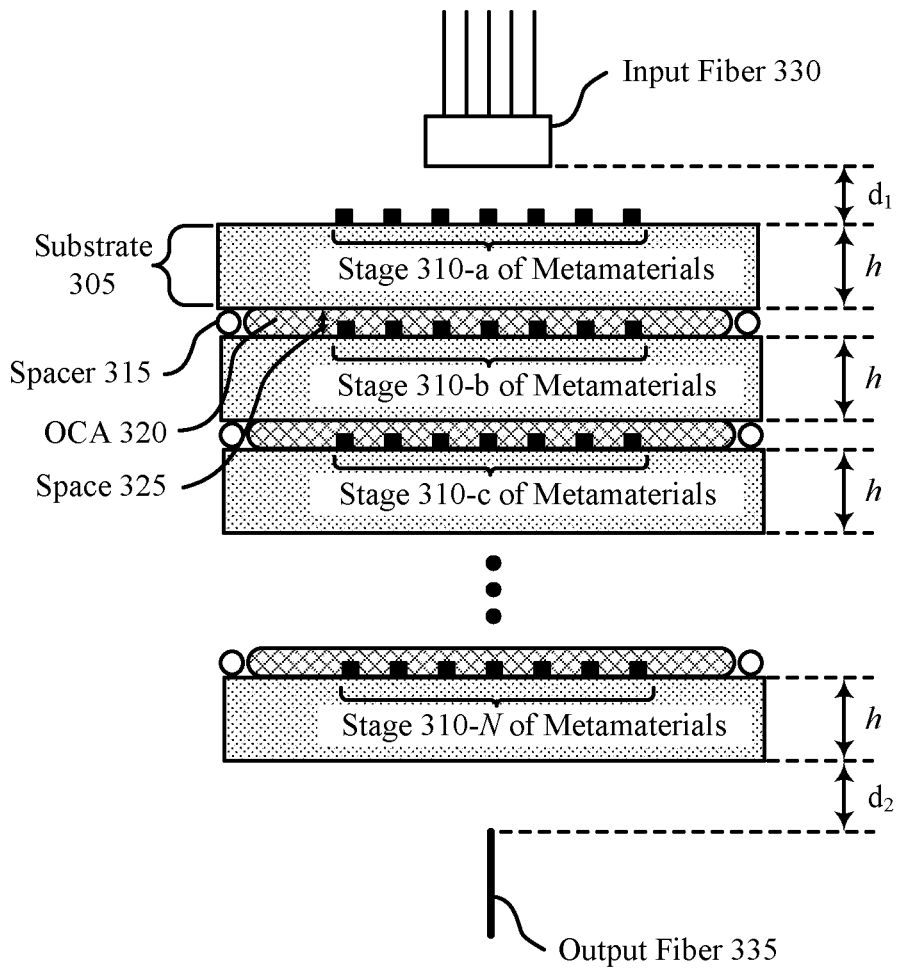
FIG. 3 illustrates an example of an optical device that supports a wavelength multiplexer or demultiplexer that uses metamaterials for optical fiber communications in accordance with examples as disclosed herein.

FIG. 3 illustrates an example of an optical device 300 that supports a wavelength multiplexer or demultiplexer that uses metamaterials for optical fiber communications in accordance with examples as disclosed herein. The optical device 300 may use optically-transmissive metamaterial structures and optically-transmissive substrates stacked on top of one another to perform wavelength multiplexing or wavelength demultiplexing techniques. The optical device 300 may be an example of the optical device 201 described with reference to FIG. 2A. The diagram illustrated in FIG. 3 may be a cross-sectional view of the optical device 300.

The optical device 300 may include a plurality of substrates 305 positioned in proximity to or in contact with a plurality of stages 310 of metamaterials. Each stage 310 of metamaterials may include a plurality of metamaterial structures. The plurality of substrates 305 and the plurality of stages 310 may be stacked on top of one another. The optical device 300 may also include one or more spacers 315 and one or more optically clear adhesives (OCAs) 320 positioned between each layer of a substrate 305 and stage 310 of metamaterials. The optical device 300 may include any quantity of layers of metamaterials to perform wavelength multiplexing or wavelength demultiplexing techniques. For example, the optical device may include a first stage 310-*a*, a second stage 310-*b*, a third stage 310-*c*, or any quantity of stages 310-N. In such examples, the optical device 300 may include any numerical of substrates 305, spacers 315, and OCAs 320 to support the stages 310. In some examples, the quantity of substrates 305 may be the same as the quantity of stages 310 of metamaterials. The quantity of layers may be determined based on a desired phase profile of the optical device 300.

The substrate 305 may be an optically-transmissive substrate that is configured to support the stage 310 of metamaterials. The substrate 305 may have one or more parameters that define the structure, such as a height (h). The substrate 305 may be an example of the substrate 205 described with reference to FIGS. 2A and 2B. In some examples, each substrate 305 in the optical device 300 may have the same parameters. Additionally or alternatively, one or more substrates 305 may have a different parameter than other substrates in the optical device 300 (e.g., the height (h) of one or more substrates 305 may be different) based on a desired phase profile of the optical device 300.

The stages 310 of metamaterials may include one or more optically-transmissive metamaterial structures that are configured to shift a phase profile of an optical signal (e.g., light) that passes through the metamaterial structures. Each stage 310 of metamaterials may be positioned in proximity to or in contact with at least one substrate 305. The metamaterial structures of the stages 310 may be examples of the metamaterial structures 210 described with reference to FIGS. 2A and 2B. The metamaterial structures of the stages 310 of metamaterials may have one or more parameters that define the metamaterial structures, such as a cross-sectional profile, a cross-sectional area, or a height, among other examples. In some examples, each stage 310 of metamaterials may be designed with a different phase profile and the combined phase profiles of each stage 310 may result in an overall phase profile of the optical device 300. In some examples, one or more stages 310 of metamaterials may have a different parameter than other stages 310 of metamaterials in the optical device 300 based on a desired phase profile of the optical device 300. In some examples, each stage 310 of metamaterials in the optical device 300 may have the same parameters.

The spacer 315 may be positioned between two different substrates 305 and may be configured to create a space 325 between different substrates 305. The spacer 315 may be positioned in proximity to or in contact with a first substrate 305 and a second substrate 305 to create the space 325. A stage 310 of metamaterials may be positioned in the space 325 created by the spacer 315. The spacer 315 may have one or more parameters that define the structure, such as a height. In some examples, each spacer 315 in the optical device 300 may have the same parameters. In some examples, one or more spacers 315 may have a different parameter than other spacers 315 in the optical device 300 (e.g., the height of one or more spacers 315 may be different). Any quantity of spacers 315 may be positioned between different substrates.

The OCA 320 may be positioned in the space 325 created by the spacer 315. The OCA 320 may be an example of a liquid OCA, or a gel OCA, or any combination thereof. The OCA 320 may be an optically-transmissive material. The OCA 320 may be configured to protect the stages 310 of metamaterials. The OCA 320 may be positioned such that a stage 310 of metamaterials is positioned in proximity to or in contact with a surface of the substrate 305 and also positioned in proximity to or in contact with OCA 320. In such examples, the OCA 320 may be positioned between one or more surfaces of a stage 310 of metamaterials and a bottom surface of substrate 305. For example, the OCA 320 may be positioned between one or more to surfaces of the metamaterial structures of the second stage 310-b of metamaterials and a bottom surface of the substrate 305. In some cases, the OCA 320 may be an example of an index-matching substance, where a refractive index of the OCA 320 may be similar to that of one or more surrounding materials.

The optical device 300 may be configured as a wavelength multiplexer. In some cases, the optical device 300 may be configured as a wavelength demultiplexer. In such cases, the inputs and outputs of the optical device 300 may be reversed. An input fiber 330 may be positioned a first distance ($d_1$) away from the first stage 310-a of metamaterials and may be configured to transmit one or more optical signals through the optical device 300. The input fiber 330 may be an example of an optical communications link 105, optical communications link 130, or optical communications link 145 described with reference to FIG. 1A. An output fiber 335 may be positioned a second distance ($d_2$) away from the last layer (e.g., the last substrate 305) of the optical device 300 and may be configured to receive one or more optical signals output from the optical device 300. The output fiber 335 may be an example of an optical communications link 105, optical communications link 130, or optical communications link 145 described with reference to FIG. 1A. In some cases, the input fiber 330, the output fiber 335, or any combination thereof, may be examples of fiber arrays with a plurality of optical fibers. In some cases, the first distance ($d_1$) may be the same size as the second distance ($d_2$). In some cases, the first distance ($d_1$) may be a size different than the size of the second distance ($d_2$). In some cases, the input fiber 330 may include one or more SMFs and the one or more input signals may be single-mode input signals. In other examples, the input fiber 330 may include one or more FMFs or MMFs and at least one input signal may be a multi-mode signal. Additionally or alternatively, the output fiber 335 may include one or more SMFs and the one or more output signals may be single-mode output signals. In other examples, the output fiber 335 may include one or more FMFs or MMFs and at least one output signal may be a multi-mode signal. In some cases, additional spacers, additional OCAs, or a combination thereof may be positioned between the input fiber 330 and the first stage 310-a of metamaterials. In some cases, additional spacers, additional OCAs, or a combination thereof may be positioned between the output fiber 335 and the last layer (e.g., the last substrate 305) of the optical device 300. Such additional spacers or additional OCAs may be configured to reduce back reflection, protect the metamaterials, or provide the spacings between fibers and the optical device, or any combination thereof.

In examples where the optical device 300 is configured as a wavelength multiplexer, the input fiber 330 may be an example of a fiber array and may transmit two or more optical signals having different wavelengths into the optical device 300. The two or more optical signals may pass through the different stages 310 of metamaterials (and other components) of the optical device 300. At each stage 310, the phase profiles of the two or more optical signals may be shifted or altered. The optical device 300, through the different stages 310, may combine the two or more optical signals into a single optical signal having the different wavelengths. The output fiber 335 may be an example of a single output fiber and may be configured to receive the optical signal that has been multiplexed to include the multiple wavelengths.

In examples where the optical device 300 is configured as a wavelength demultiplexer, the input fiber 330 may be an example of a single fiber and may transmit one optical signal that has different wavelengths into the optical device 300. The optical signal may pass through the different stages 310 of metamaterials (and other components) of the optical device 300. At each stage 310, the phase profile of the optical signal may be shifted or altered. The optical device 300, through the different stages 310, may separate the optical signal into two or more different optical signals having the different wavelengths. The output fiber 335 may be an example of a fiber array and may be configured to receive the two or more optical signals that have been demultiplexed from the original optical signal.

In some cases, the optical device 300 may be used for WDM application. The optical device 300 may coherently adjust multiplex/demultiplex wavelengths of light into the same optical signal or out of the same optical signal into different optical signals. The light in the first stage of metamaterials may propagate in many directions, and may interfere with each other while traveling to or on the second stage of metamaterials. The second stage of metamaterials may propagate light in many directions, which light may interfere with each other while traveling to or on the third stage of metamaterials. The spacer 315 may be configured to allow the light propagating between stages 310 of metamaterials to interfere with each other.

FIGS. 4A-4E illustrate examples of optical devices that support a wavelength multiplexer or demultiplexer that uses metamaterials for optical fiber communications in accordance with examples as disclosed herein. The optical devices illustrated in FIGS. 4A-4E may be examples of folded designs for optical devices that use reflective surfaces to communicate light between different stages of metamaterials. The optical devices illustrated in FIGS. 4A-4E may be examples of the optical device 202 described with reference to FIG. 2B. FIGS. 4A-4E illustrate a variety of different configurations for a folded design of an optical device that operates as a wavelength multiplexer or a wavelength demultiplexer. The disclosure is not limited to the express optical device configurations illustrated. Any feature of any optical device configuration illustrated in FIGS. 4A-4E may be combined with any other feature of any optical device configuration illustrated in FIGS. 4A-4E. Aspects of the optical devices are initially described with reference to FIG. 4A, but are omitted from the descriptions of optical devices in FIGS. 4B-4E. Similarly numbered or similarly embodied features in the optical devices in FIGS. 4A-4E may be treated similarly. FIGS. 4A-4E illustrate optical devices having four stages of metamaterials. The optical devices of FIGS. 4A-4E, however, can be configured any number of stages of metamaterials (e.g., one stage, two stages, three stages, four stages, five stages, six stages, seven stages, eight stages, nine stages, etc.). The diagrams illustrated in FIGS. 4A-4E may be a cross-sectional views of the optical devices.

Figure 4A:
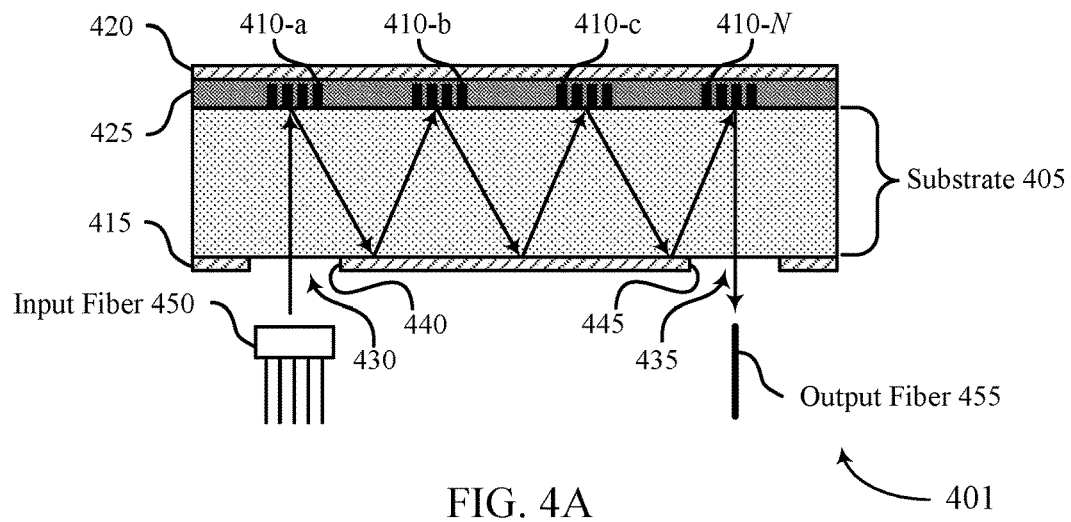
FIGS. 4A-4E illustrate examples of optical devices that support a wavelength multiplexer or demultiplexer that uses metamaterials for optical fiber communications in accordance with examples as disclosed herein.

FIG. 4A illustrates an example of an optical device 401 that supports a wavelength multiplexer or demultiplexer that uses metamaterials for optical fiber communications in accordance with examples as disclosed herein. The optical device 401 may use optically-transmissive metamaterial structures, an optically-transmissive substrate, and reflectors in a folded design to perform wavelength multiplexing or wavelength demultiplexing techniques. The optical device 401 may be an example of the optical device 202 described with reference to FIG. 2B.

The optical device 401 may include a substrate 405 positioned in proximity to or in contact with a plurality of stages 410 of metamaterials, a first reflector 415, and a second reflector 420. Each stage 410 of metamaterials may include a plurality of metamaterial structures. The substrate 405, the plurality of stages 410, the first reflector 415, and the second reflector 420 may illustrate a folded design where light bounces between the two reflectors 415 and 420 and interacts with the stages 410 of metamaterials based on the light following the reflected paths. The optical device 401 may include any quantity of stages 410 of metamaterials to perform wavelength multiplexing or wavelength demultiplexing techniques. For example, the optical device may include a first stage 410-a, a second stage 410-b, a third stage 410-c, or any quantity of stages 410-N.

The substrate 405 may be an optically-transmissive substrate that is configured to support the stage 410 of metamaterials. The substrate 405 may have one or more parameters that define the structure, such as a height or a cross-sectional area. The substrate 405 may be an example of the substrate 205 described with reference to FIGS. 2A and 2B.

The stages 410 of metamaterials may include one or more optically-transmissive metamaterial structures that are configured to shift a phase profile of an optical signal (e.g., light) that passes through the metamaterial structures. Each stage 410 of metamaterials may be positioned in proximity to or in contact with the substrate 405. The metamaterial structures of the stages 410 may be examples of the metamaterial structures 210 described with reference to FIGS. 2A and 2B. The metamaterial structures of the stages 410 of metamaterials may have one or more parameters that define the metamaterial structures, such as a cross-sectional profile, a cross-sectional area, or a height. In some examples, each stage 410 of metamaterials may be designed with a different phase profile and the combined phase profiles of each stage 410 may result in an overall phase profile of the optical device 401. In some examples, one or more stages 410 of metamaterials may have a different parameter than other stages 410 of metamaterials in the optical device 401 based on a desired phase profile of the optical device 401. In some examples, each stage 410 of metamaterials in the optical device 401 may have the same parameters.

A first reflector 415 may be connected with the substrate 405. The first reflector 415 may be configured to reflect an optical signal in the optical device 401 along an optical path and on to a subsequent stage 410 of metamaterials, to the second reflector 420, or any combination thereof. In some cases, the first reflector 415 may be formed of a reflective material that has a relatively greater property of reflecting light, such as gold. In some cases, the first reflector 415 may be coated with a reflective material that has a relatively greater property of reflecting light (such as gold).

The second reflector 420 may be positioned near or adjacent to the stages 410 of metamaterials. The second reflector 420 may be configured to reflect an optical signal in the optical device 401 along an optical path and on to a subsequent stage 410 of metamaterials, to the first reflector 415, or any combination thereof. In some cases, the second reflector 420 may be formed of a reflective material that has a relatively greater property of reflecting light, such as gold. In some cases, the second reflector 420 may be coated with a reflective material that has a relatively greater property of reflecting light (such as gold).

In some examples, the optical device 401 may include cladding 425 that may be configured to protect the metamaterial structures of the stages 410 from damage, mitigate losses of optical signals interacting with the metamaterial structures, or any combination thereof. In some cases, the cladding 425 may be positioned between a surface of a metamaterial structure and the second reflector 420 that is adjacent to the stages 410 of metamaterials. In such cases, a distance (e.g., a distance 230 described with reference to FIG. 2B) may be formed between the surface of the metamaterial structure and a surface of the second reflector 420. The surface of the metamaterial structure near the second reflector 420 may be positioned opposite a different surface of the metamaterial structure that contacts the substrate 405.

The first reflector 415, the second reflector 420, and the stages 410 of metamaterials may be configured to direct the optical signal along the desired optical path in the optical device 401. In some cases, one or more locations of the first reflector 415 and the second reflector 420 may be configured to redirect light in a different direction. For example, an optical signal may impact a reflector at an approximately orthogonal angle to the plane of the reflector and the reflector may be configured to direct the optical signal in a different direction. In some examples, a stage 410 of metamaterials may be configured to alter a direction of the optical signal. In some cases, the first reflector 415, the second reflector 420, or at least one stage 410 of metamaterials, or any combination thereof, may be configured to change a direction of travel of the optical signal.

The optical device 401 may include an input aperture 430 for receiving an input optical signal into the optical device 401 or an output aperture 435 for outputting an output optical signal from the optical device 401 or both. In an illustrative example the optical device 401, the input aperture 430 and the output aperture 435 are formed by the first reflector 415. One or more sidewalls 440 of the first reflector 415 may form the input aperture 430. Likewise, one or more sidewalls 445 of the first reflector 415 may form the output aperture 435. In some examples, the first reflector 415 may form one aperture (e.g., either the input aperture 430 or the output aperture 435) and the second reflector 420 may form the other aperture (e.g., either the input aperture 430 or the output aperture 435).

The optical device 401 may be configured as a wavelength multiplexer. In some cases, the optical device 401 may be configured as a wavelength demultiplexer. In such cases, the inputs and outputs of the optical device 401 may be reversed. An input fiber 450 may be positioned a first distance away from the input aperture 430 and may be configured to transmit one or more optical signals into the optical device 401. The input fiber 450 may be an example of an optical communications link 105 or one or more optical communication links 130 described with reference to FIG. 1A. An output fiber 455 may be positioned a second distance away from the output aperture 435 of the optical device 401 and may be configured to receive one or more optical signals output from the optical device 401. The output fiber 455 may be an example of an optical communications link 105 described with reference to FIG. 1A. In some cases, the input fiber 450, the output fiber 455, or any combination thereof, may be examples of fiber arrays with a plurality of optical fibers. In some cases, the first distance may be the same size as the second distance. In some cases, the first distance may be a size different than the size of the second distance. In some cases, additional spacers, additional OCAs, or a combination thereof may be positioned between the input fiber 450 and the optical device 401. In some cases, additional spacers, additional OCAs, or a combination thereof may be positioned between the output fiber 455 and the optical device 401. Such additional spacers or additional OCAs may be configured to reduce back reflection, protect the metamaterials, or provide the spacings between fibers and the optical device, or any combination thereof.

In examples where the optical device 401 is configured as a wavelength multiplexer, the input fiber 450 may be an example of a fiber array and may transmit two or more optical signals having different wavelengths into the optical device 401. The two or more optical signals may be reflected through the optical device 401 by the first reflector 415 and the second reflector 420 and may pass through the different stages 410 of metamaterials (and other components) of the optical device 401. At each stage 410, the phase profiles of the two or more optical signals may be shifted or altered. The optical device 401, through the different stages 410, may combine the two or more optical signals into a single optical signal having the different wavelengths. The output fiber 455 may be an example of a single-output fiber and may be configured to receive the optical signal that has been multiplexed to include the multiple wavelengths. In some cases, the input fiber 450 may include one or more SMFs and the one or more input signals may be single-mode input signals. In other examples, the input fiber 450 may include one or more FMFs or MMFs and at least one input signal may be a multi-mode signal. Additionally or alternatively, the output fiber 455 may include one or more SMFs and the one or more output signals may be single-mode output signals. In other examples, the output fiber 455 may include one or more FMFs or MMFs and at least one output signal may be a multi-mode signal.

In examples where the optical device 401 is configured as a wavelength demultiplexer, the input fiber 450 may be an example of a single fiber and may transmit one optical signal that has different wavelengths into the optical device 401. The optical signal may be reflected through the optical device 401 by the first reflector 415 and the second reflector 420 and may pass through the different stages 410 of metamaterials (and other components) of the optical device 401. At each stage 410, the phase profile of the optical signal may be shifted or altered. The optical device 401, through the different stages 410, may separate the optical signal into two or more different optical signals having the different wavelengths. The output fiber 455 may be an example of a fiber array and may be configured to receive the two or more optical signals that has been demultiplexed from the original optical signal.

In some cases, the optical device 401 may be used for WDM application. The optical device 401 may coherently adjust wavelengths of light into the same optical signal or out of the same optical signal into different optical signals. The light in the first stage of metamaterials may propagate in many directions, and may interfere with each other while traveling to or on the second stage of metamaterials. The second stage of metamaterials may propagate light in many directions, which light may interfere with each other while traveling to or on the third stage of metamaterials.

Figure 4B:
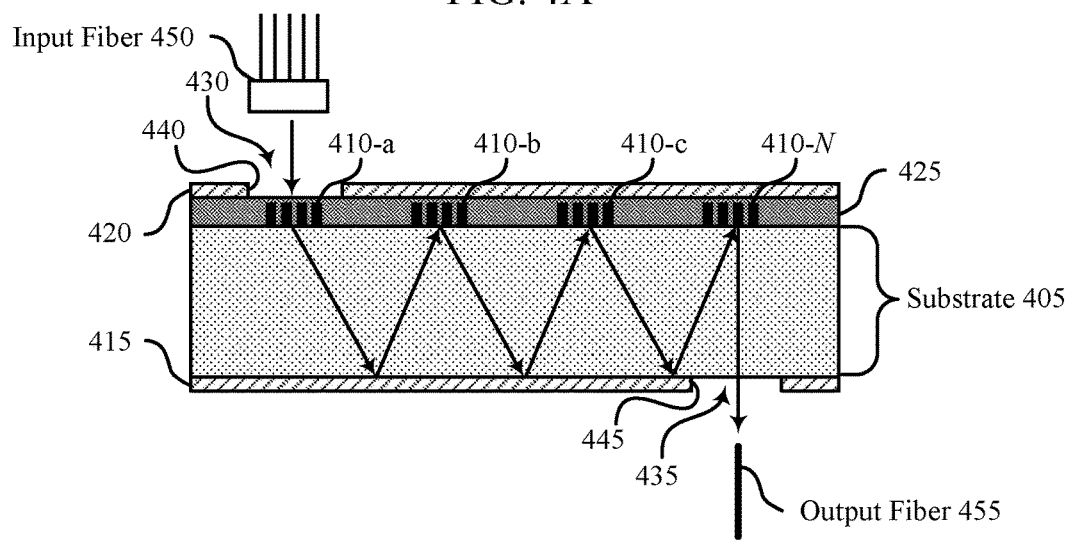

FIG. 4B illustrates an example of an optical device 402 that supports a wavelength multiplexer or demultiplexer that uses metamaterials for optical fiber communications in accordance with examples as disclosed herein. The optical device 402 may use optically-transmissive metamaterial structures, an optically-transmissive substrate, and reflectors in a folded design to perform wavelength multiplexing or wavelength demultiplexing techniques. The optical device 402 may be an example of the optical devices 202 and 401 described with reference to FIGS. 2B and 4A. The optical device 402 may be similarly embodied as the optical device 401 and similarly numbered and named elements may be embodied similarly.

The optical device 402 may include a few features that are different than the optical device 401 described with reference to FIG. 4A. For example, the input aperture 430 may be formed in the second reflector 420 by the one or more sidewalls 440, and the output aperture 435 continues to be formed in the first reflector 415 by the one or more sidewalls 445. An input optical signal may pass through the first stage 410-a of metamaterials before passing through the substrate 405. In such cases, the input aperture 430 may be positioned in the second reflector 420 that is positioned near the stages 410 of metamaterials. In addition, the input signal may be transmitted at an approximately orthogonal angle relative to a plane of the input aperture 430 or the plane of the first stage 410-a of metamaterials. The first stage 410-a of metamaterials may be configured to alter the direction of travel of the optical signal. The last stage 410-N of metamaterials may be also configured to alter the direction of travel of the optical signal. In some cases, the second reflector 420, the last stage 410-N of metamaterials, or any combination thereof may be configured to alter the direction of travel of the optical signal. In some cases, the first stage 410-a of metamaterials may be an example of a transmissive stage of metamaterials and the subsequent stages 410 of metamaterials may be examples of reflective stages of metamaterials.

Figure 4C:
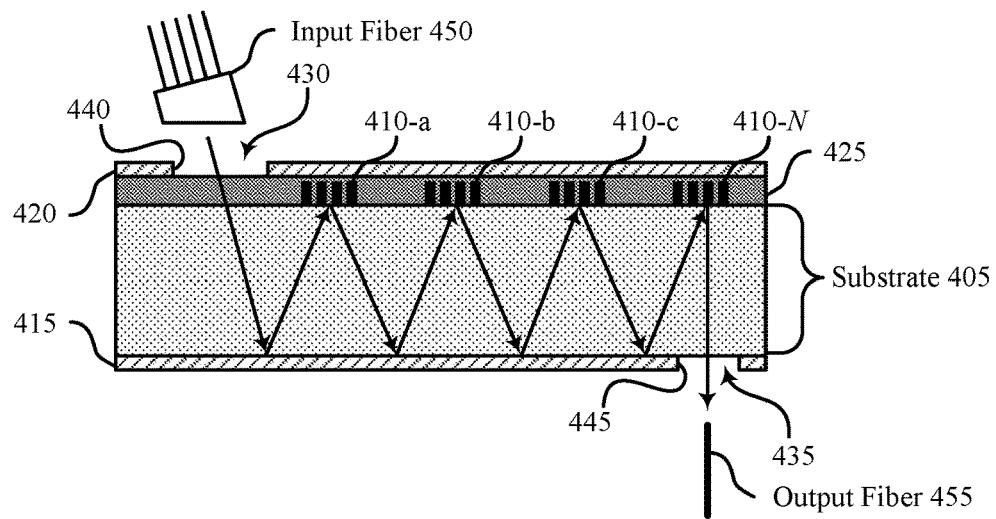

FIG. 4C illustrates an example of an optical device 403 that supports a wavelength multiplexer or demultiplexer that uses metamaterials for optical fiber communications in accordance with examples as disclosed herein. The optical device 403 may use optically-transmissive metamaterial structures, an optically-transmissive substrate, and reflectors in a folded design to perform wavelength multiplexing or wavelength demultiplexing techniques. The optical device 403 may be an example of the optical devices 202, 401, and 402 described with reference to FIGS. 2B and 4A-4B. The optical device 403 may be similarly embodied as the optical device 401 and similarly numbered and named elements may be embodied similarly.

The optical device 403 may include a few features that are different than the optical device 401 described with reference to FIG. 4A. The input aperture 430 may be formed in the second reflector 420 by the one or more sidewalls 440, and the output aperture 435 continues to be formed in the first reflector 415 by the one or more sidewalls 445. An input optical signal may pass through the cladding 425 (without any stage of metamaterials) before passing through the substrate 405. In such cases, the input aperture 430 may be positioned in the second reflector 420 positioned near the stages 410 of metamaterials. The input signal may be configured to be transmitted into the optical device 403 at an angle that is non-orthogonal relative to a plane defined by the input aperture 430, a plane defined by the reflectors 415, 420, a plane defined by the cladding 425, a plane defined by the stages 410 of metamaterials, or a plane defined by the substrate 405, or any combination thereof. The non-orthogonal angle may be configured to cause the optical signal to reflect between the reflectors 415, 420 along an optical path to the successive stages 410 of metamaterials. The last stage 410-N of metamaterials may be also configured to alter the direction of travel of the optical signal. In some cases, the second reflector 420, the last stage 410-N of metamaterials, or any combination thereof may be configured to alter the direction of travel of the optical signal.

Figure 4D:
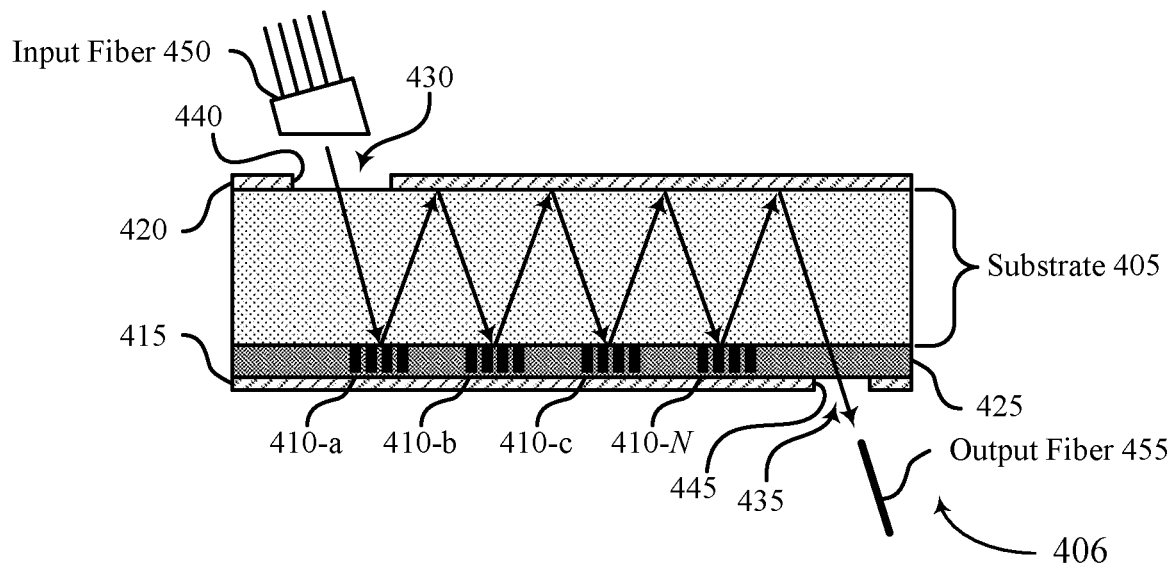

FIG. 4D illustrates an example of an optical device 406 that supports a wavelength multiplexer or demultiplexer that uses metamaterials for optical fiber communications in accordance with examples as disclosed herein. The optical device 406 may use optically-transmissive metamaterial structures, an optically-transmissive substrate, and reflectors in a folded design to perform wavelength multiplexing or wavelength demultiplexing techniques. The optical device 406 may be an example of the optical devices 202, 401, 402, and 403 described with reference to FIGS. 2B and 4A-4C. The optical device 406 may be similarly embodied as the optical device 401 and similarly numbered and named elements may be embodied similarly.

The optical device 406 may include a few features that are different than the optical device 401 described with reference to FIG. 4A. For instance, the stages 410 of metamaterials may be positioned adjacent to the first reflector 415, rather than second reflector 420 (as compared with the optical device 401). The input aperture 430 may be formed in the second reflector 420 by the one or more sidewalls 440, and the output aperture 435 continues to be formed in the first reflector 415 by the one or more sidewalls 445. The input aperture 430 is positioned in the second reflector 420 that is positioned on the opposite side of the substrate 405 from the stages 410 of metamaterials. The input signal may be transmitted into the optical device 403 at an angle that is non-orthogonal relative to a plane defined by the input aperture 430, a plane defined by the reflectors 415, 420, a plane defined by the cladding 425, a plane defined by the stages 410 of metamaterials, or a plane defined by the substrate 405, or any combination thereof. The non-orthogonal angle may be configured to cause the optical signal to reflect between the reflectors 415, 420 along an optical path to the successive stages 410 of metamaterials. The output signal may be output through the output aperture 435 at an angle that is non-orthogonal relative to a plane defined by the input aperture 430, a plane defined by the reflectors 415, 420, a plane defined by the cladding 425, a plane defined by the stages 410 of metamaterials, or a plane defined by the substrate 405, or any combination thereof.

Figure 4E:
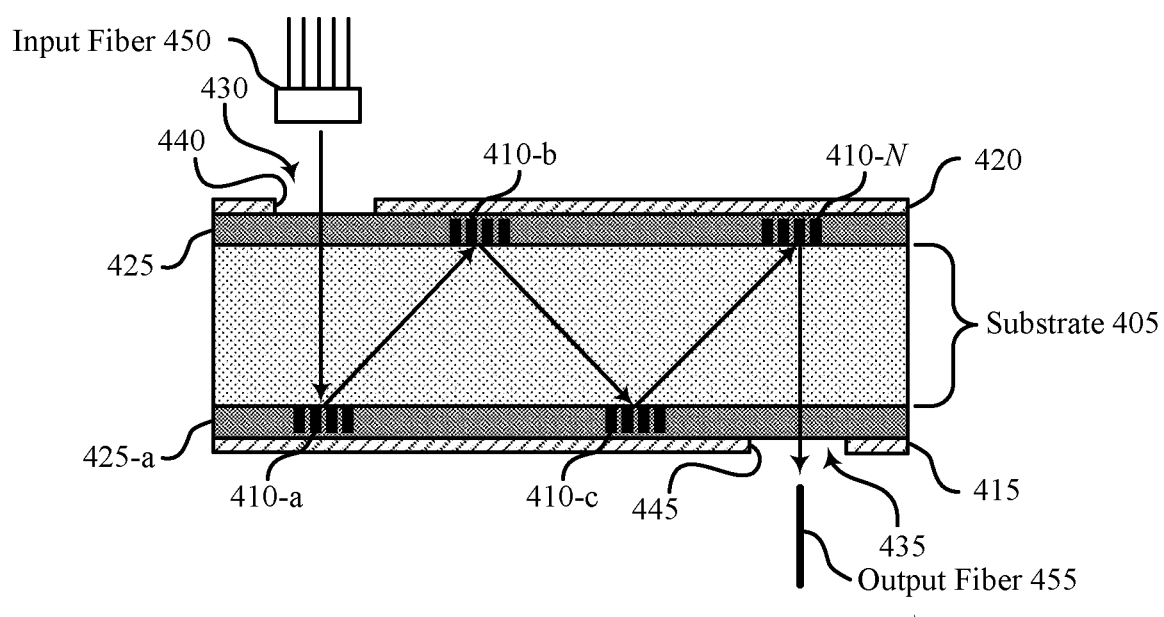

FIG. 4E illustrates an example of an optical device 407 that supports a wavelength multiplexer or demultiplexer that uses metamaterials for optical fiber communications in accordance with examples as disclosed herein. The optical device 407 may use optically-transmissive metamaterial structures, an optically-transmissive substrate, and reflectors in a folded design to perform wavelength multiplexing or wavelength demultiplexing techniques. The optical device 407 may be an example of the optical devices 202, 401, 402, 403, and 406 described with reference to FIGS. 2B and 4A-4D. The optical device 407 may be similarly embodied as the optical device 401 and similarly numbered and named elements may be embodied similarly.

The optical device 407 may include a few features that are different than the optical device 401 described with reference to FIG. 4A. The optical device 407 may include stages 410 of metamaterials positioned adjacent near both the first reflector 415 and the second reflector 420. For example, the first stage 410-a of metamaterials may be positioned adjacent to the first reflector 415 and the second stage 410-b of metamaterials may be positioned adjacent to the second reflector 420. The optical device 407 also includes a second cladding 425-a to protect the stages 410 of metamaterials positioned near the first reflector 415. In optical device 407, stages 410 of metamaterials may be positioned at every reflection point of the optical path in the optical device 407. In some examples, at least one reflection point in the optical device 407 may not be associated with a stage of metamaterials. In such examples, the optical signal may be reflected at least once by one of the reflectors 415 or 420 without passing through a stage 410 of metamaterials.

The input aperture 430 may be formed in the second reflector 420 by the one or more sidewalls 440, and the output aperture 435 continues to be formed in the first reflector 415 by the one or more sidewalls 445. An input optical signal may pass through the cladding 425 (without any stage of metamaterials) before passing through the substrate 405. In such cases, the input aperture 430 may be positioned in the second reflector 420 that is positioned near the stages 410 of metamaterials. In some examples, a stage 410 of metamaterials may be positioned in the cladding 425 just below the input aperture 430. Additionally or alternatively, in some examples, a stage of metamaterials may be positioned in the cladding 425-a just above the output aperture 435. The first stage 410-a of metamaterials and the last stage 410-N of metamaterials may be also configured to alter the direction of travel of the optical signal. In some cases, the first reflector 415, the first stage 410-a of metamaterials, or any combination thereof may be configured to alter the direction of travel of the optical signal. In some cases, the second reflector 420, the last stage 410-N of metamaterials, or any combination thereof may be configured to alter the direction of travel of the optical signal.

In some examples, the optical devices 401, 402, 403, 406, or 407 may be configured as examples of resonant folded designs. In such designs, the general structure of the optical devices is similar to the designs for folded designs. A difference between a folded design and a resonant folded design may include the design of the phase profiles of the stages of the metamaterials. For example, in both stacked designs and folded designs, there may be a fixed number of times the light interacts with the stages of metamaterials. In a resonant folded design, however, it is possible for the light to interact with the stages of metamaterials a relatively large number of times (e.g., on the order of hundreds or thousands of times), or in essence an indefinite or infinite number of times. In a resonant folded design, a top surface of the substrate 405 and a bottom surface of the substrate 405 may form a Fabry-Perot cavity, with stages 410 of metamaterials positioned near such surfaces with one or more specific phase profiles. In such examples, a single stage 410 of metamaterials can interact more strongly with the light as compared with designs where a single stage of metamaterials interacts with the light once.

To find the appropriate phase profile for the resonant structure, the electric field inside the metamaterials may be solved under a stationary condition, using an iterative solver (such as Conjugate Gradient (CG), Conjugate Gradient Squared (CGS), Generalized Minimal RESidual iteration (GMRES), Loose GMRES (LGMRES), etc.). An adjoint analysis may be implemented, similar to those described above, to calculate the derivate of the figure of merit with respect to the phase profile, and a nonlinear enhancement may be used to converge the design.

FIGS. 5A-5F illustrate an example of a method for manufacturing an optical device that supports a wavelength multiplexer or demultiplexer that uses metamaterials for optical fiber communications in accordance with examples as disclosed herein. Each of FIGS. 5A-5F illustrate a perspective view of a cut-away portion of a larger optical device. The cut-away portion in each figure has been limited to illustrate how various aspects of the optical device are formed, but additional structure and functionality supporting a wavelength multiplexer or demultiplexer that uses metamaterials for optical fiber communications are contemplated. The operations described herein may be used to form any of the optical devices described with reference to FIGS. 2A-4E. The method may be a top-down approach to forming an optical device.

Figure 5A:
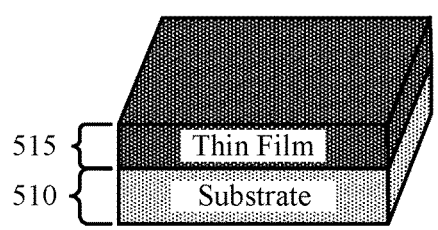
FIGS. 5A-5F illustrate an example of a method for manufacturing an optical device that supports a wavelength multiplexer or demultiplexer that uses metamaterials for optical fiber communications in accordance with examples as disclosed herein.

FIG. 5A illustrates an example of a first operation of a method for manufacturing an optical device that supports a wavelength multiplexer or demultiplexer that uses metamaterials for optical fiber communications in accordance with examples as disclosed herein. The first operation may not be the first step in the manufacturing process for the optical device, but it is the first operation described in FIGS. 5A-5F. FIG. 5A illustrates an optical device 501 that includes a substrate 510 and a layer of metamaterial 515. The optical device 501 is a device as it occurs after the first operation in the manufacturing process is complete.

The first operation may include forming the substrate 510 (e.g., by one or more deposition steps and/or one or more etching steps). The substrate 510 may be an example of the substrates 205, 305, and 405 described with reference to FIGS. 2A-4E. In some cases, the substrate 510 may be formed of glass or fused silica. In some examples, the substrate 510 may be grown rather than deposited. The terms deposited and grown may be used interchangeably herein.

Also, as part of the first operation, the layer of metamaterial 515 may be deposited on the substrate 510. In some cases, the layer of metamaterial 515 may be an example of metamaterials that are used to form the metamaterial structures in the finished optical device. The layer of metamaterials 515 may be an example of the metamaterial structures or stages of metamaterials described with reference to FIGS. 2A-4E.

Figure 5B:
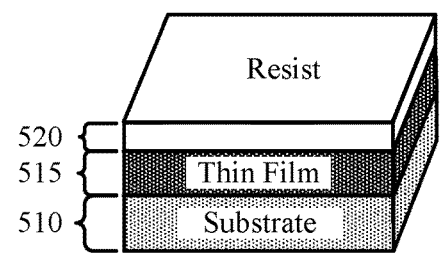

FIG. 5B illustrates an example of a second operation of a method for manufacturing an optical device that supports a wavelength multiplexer or demultiplexer that uses metamaterials for optical fiber communications in accordance with examples as disclosed herein. The second operation occurs after the first operation described with reference to FIG. 5A. In some cases, other steps or operations may occur between the first operation and the second operation. FIG. 5B illustrates an optical device 502 that includes the substrate 510, the layer of metamaterial 515, and the resist layer 520. The optical device 502 is a device as it occurs after the second operation in the manufacturing process is complete.

In the second operation, a resist layer 520 is deposited or coated on the layer of metamaterial 515. In some cases, the resist layer 520 may be an example of a hard mask material or sacrificial layer, or any combination thereof.

Figure 5C:
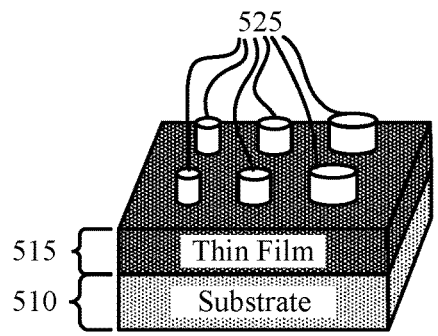

FIG. 5C illustrates an example of a third operation of a method for manufacturing an optical device that supports a wavelength multiplexer or demultiplexer that uses metamaterials for optical fiber communications in accordance with examples as disclosed herein. The third operation occurs after the second operation described with reference to FIG. 5B. In some cases, other steps or operations may occur between the second operation and the third operation. FIG. 5C illustrates an optical device 503 that includes the substrate 510, the layer of metamaterial 515, and a plurality of hardmasks 525 formed from the resist layer 520. The optical device 503 is a device as it occurs after the third operation in the manufacturing process is complete.

In the third operation, portions of the resist layer 520 are removed to form the plurality of hardmasks 525. Each hardmask 525 of the plurality of hardmasks include one or more parameters (e.g., cross-sectional profile, cross-sectional area, or height) that are configured to control the parameters of the metamaterial structures that result from the plurality of hardmasks 525. The plurality of hardmasks 525 may be formed using one or more etching processes, e-beam lithography, photo-lithography, nanoimprint, or any combination thereof.

Figure 5D:
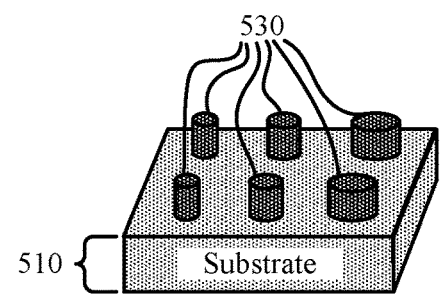

FIG. 5D illustrates an example of a fourth operation of a method for manufacturing an optical device that supports a wavelength multiplexer or demultiplexer that uses metamaterials for optical fiber communications in accordance with examples as disclosed herein. The fourth operation occurs after the third operation described with reference to FIG. 5C. In some cases, other steps or operations may occur between the third operation and the fourth operation. FIG. 5D illustrates an optical device 504 that includes the substrate 510 and a plurality of metamaterial structures 530 formed from the layer of metamaterial 515 and were formed based on the parameters of the plurality of hardmasks 525. The optical device 504 is a device as it occurs after the fourth operation in the manufacturing process is complete.

In the fourth operation, portions of the layer of metamaterials 515 and the plurality of hardmasks 525 are removed to form the plurality of metamaterial structures 530. In some cases, a pattern of the resist layer may be etched. Each metamaterial structure 530 of the plurality of metamaterial structures include one or more parameters (e.g., cross-sectional profile, cross-sectional area, or height) that are configured based on the parameters of the hardmasks initially positioned above the metamaterial structure. The plurality of metamaterial structures 530 may be formed using one or more etching processes, e-beam lithography, photo-lithography, nanoimprint, or any combination thereof. In some cases, a single process from the processes listed above may be used as part of the fourth operation. In some cases, two or more processes from the processes listed above may be used as part of the fourth operation.

Figure 5E:
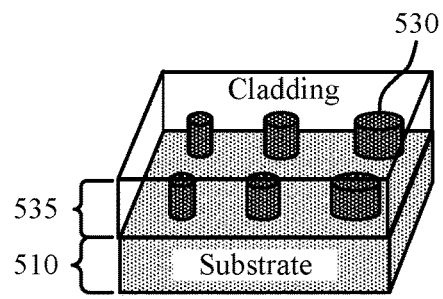

FIG. 5E illustrates an example of a fifth operation of a method for manufacturing an optical device that supports a wavelength multiplexer or demultiplexer that uses metamaterials for optical fiber communications in accordance with examples as disclosed herein. The fifth operation occurs after the fourth operation described with reference to FIG. 5D. In some cases, other steps or operations may occur between the fourth operation and the fifth operation. FIG. 5E illustrates an optical device 505 that includes the substrate 510, a plurality of metamaterial structures 530, and cladding 535. The optical device 505 is a device as it occurs after the fifth operation in the manufacturing process is complete.

In the fifth operation, cladding 535 is deposited on the substrate 510 and the plurality of metamaterial structures 530. The cladding 535 may be an example of the cladding 215 or the cladding 425 described with reference to FIGS. 2A and 4A-4E. The cladding 535 may be configured to protect the metamaterial structures 530 from damage, mitigate losses of optical signals interacting with the metamaterial structures, or any combination thereof.

Figure 5F:
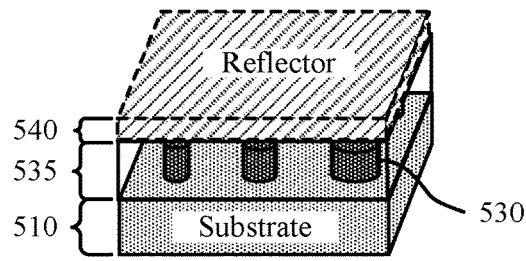

FIG. 5F illustrates an example of a sixth operation of a method for manufacturing an optical device that supports a wavelength multiplexer or demultiplexer that uses metamaterials for optical fiber communications in accordance with examples as disclosed herein. The sixth operation occurs after the fifth operation described with reference to FIG. 5D. In some cases, other steps or operations may occur between the fifth operation and the sixth operation. FIG. 5F illustrates an optical device 506 that includes the substrate 510, a plurality of metamaterial structures 530, cladding 535, and a reflector 540. The optical device 506 is a device as it occurs after the sixth operation in the manufacturing process is complete.

In the sixth operation, a material is deposited to form the reflector 540. In some cases, the material is a reflective material (e.g., a metal such as gold). In some cases, the material is coated with a reflective material (e.g., a metal such as gold) to form the reflector 540. The reflector 540 may be formed to be positioned in proximity to or in contact with the cladding 535. In some cases, the cladding 535 is positioned between the metamaterial structures 530 and the reflector 540. The reflector 540 may be an example of the reflectors 220, 415, and 420 described with reference to FIGS. 2B and 4A-4E. In some cases, the optical device 506 may represent a portion of a completed memory device described with reference to FIGS. 2A-4E.

In the top-down approach to manufacturing the optical device, a material used for the metamaterial structures is put on the substrate 510, as described in FIG. 5A, by processes such as wafer bonding and/or film deposition processes such as plasma enhanced chemical vapor deposition (PECVD), low pressure chemical vapor deposition (LPCVD), atomic layer deposition (ALD), thermal evaporation, e-beam evaporation, sputtering, and so on. The techniques for patterning the structure (e.g., FIGS. 5B and 5C) can be lithography methods, such as e-beam lithography, photolithography, nanoimprint lithography, or any combination thereof. Other techniques such as self-assembly may also be utilized to pattern the device. Depending on the techniques and materials chosen for the device, different resist and etching techniques can be employed to transfer the pattern to the metamaterial layer as shown in FIG. 5D (e.g., the techniques can be dry etching techniques, such as reactive ion etching, inductively coupled plasma etching, or ion milling, or any combination thereof). In some cases, another layer of other materials can be added on top of the thin film layer (e.g., the layer of metamaterial 515) to act as a hard mask in the etching process, instead of using the resist as the etching mask. Depending on the design, a cladding layer can be added to protect or support the structure, which may be added using coating techniques (such as spin coating) or deposition techniques described herein (e.g., as shown in FIG. 5E). The reflector (e.g., metal) layer can be added on top of the cladding layer using deposition techniques described herein (e.g., as shown in FIG. 5F).

FIGS. 6A-6F illustrate an example of a method for manufacturing an optical device that supports a wavelength multiplexer or demultiplexer that uses metamaterials for optical fiber communications in accordance with examples as disclosed herein. Each of FIGS. 6A-6F illustrate a perspective view of a cut-away portion of a larger optical device. The cut-away portion in each figure has been limited to illustrate how various aspects of the optical device are formed, but additional structure and functionality supporting a wavelength multiplexer or demultiplexer that uses metamaterials for optical fiber communications are contemplated. The operations described herein may be used to form any of the optical devices described with reference to FIGS. 2A-4E. The method may be a bottom-up approach to forming an optical device.

Figure 6A:
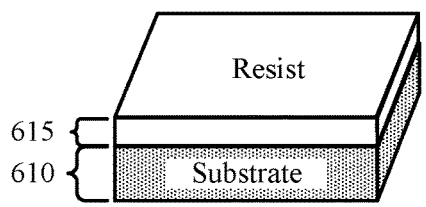
FIGS. 6A-6F illustrate an example of a method for manufacturing an optical device that supports a wavelength multiplexer or demultiplexer that uses metamaterials for optical fiber communications in accordance with examples as disclosed herein.

FIG. 6A illustrates an example of a first operation of a method for manufacturing an optical device that supports a wavelength multiplexer or demultiplexer that uses metamaterials for optical fiber communications in accordance with examples as disclosed herein. The first operation may not be the first step in the manufacturing process for the optical device, but it is the first operation described in FIGS. 6A-6F. FIG. 6A illustrates an optical device 601 that includes a substrate 610 and a resist layer 615. The optical device 601 is a device as it occurs after the first operation in the manufacturing process is complete.

The first operation may include forming the substrate 610 (e.g., by one or more deposition steps and/or one or more etching steps). The substrate 610 may be an example of the substrates 205, 305, and 405 described with reference to FIGS. 2A-4E. In some examples, the substrate 610 may be grown rather than deposited (e.g., using a Czochralski process). The terms deposited and grown may be used interchangeably herein.

Also, as part of the first operation, a resist layer 615 may be deposited or coated on the substrate 610. In some cases, the resist layer 615 may be an example of a hard mask material or sacrificial layer, or any combination thereof.

Figure 6B:
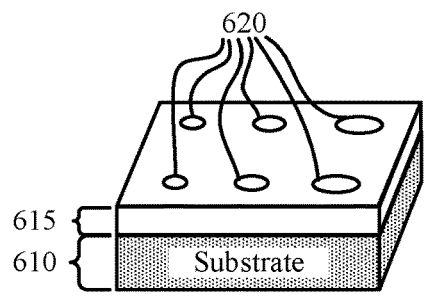

FIG. 6B illustrates an example of a second operation of a method for manufacturing an optical device that supports a wavelength multiplexer or demultiplexer that uses metamaterials for optical fiber communications in accordance with examples as disclosed herein. The second operation occurs after the first operation described with reference to FIG. 6A. In some cases, other steps or operations may occur between the first operation and the second operation. FIG. 6B illustrates an optical device 602 that includes the substrate 610, the resist layer 615, and a plurality of cavities 620 formed in the resist layer 615. The optical device 602 is a device as it occurs after the second operation in the manufacturing process is complete.

In the second operation, portions of the resist layer 615 are removed to form the plurality of cavities 620. In some cases, a pattern of the resist layer 615 may be etched. Each cavity 620 of the plurality of cavities may include one or more parameters (e.g., cross-sectional profile, cross-sectional area, or height) that are configured to control the parameters of the metamaterial structures that result from the plurality of cavities 620. The plurality of cavities 620 may be formed using one or more etching processes, e-beam lithography, photo-lithography, nanoimprint, or any combination thereof.

Figure 6C:
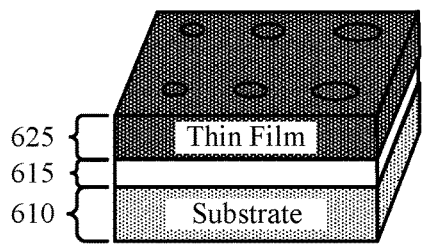

FIG. 6C illustrates an example of a third operation of a method for manufacturing an optical device that supports a wavelength multiplexer or demultiplexer that uses metamaterials for optical fiber communications in accordance with examples as disclosed herein. The third operation occurs after the second operation described with reference to FIG. 6B. In some cases, other steps or operations may occur between the second operation and the third operation. FIG. 6C illustrates an optical device 603 that includes the substrate 610, the resist layer 615, and the layer of metamaterial 625. The optical device 603 is a device as it occurs after the third operation in the manufacturing process is complete.

In the third operation, the layer of metamaterial 625 may be deposited on the resist layer 615 and in the plurality of cavities 620 formed in the resist layer 615. In some cases, the layer of metamaterial 625 may be an example of metamaterials that are used to form the metamaterial structures in the finished optical device. The layer of metamaterials 625 may be an example of the metamaterial structures or stages of metamaterials described with reference to FIGS. 2A-4E. In some cases, the layer of metamaterial 625 may also include a plurality of cavities after being deposited. In such cases, the thickness of the deposited film may be uniform across the device. In such cases, material of the layer of metamaterial 625 that fills the plurality of cavities 620 may leave a similar cavity above it in the layer of metamaterial 625.

Figure 6D:
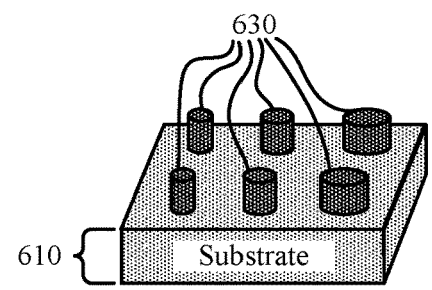

FIG. 6D illustrates an example of a fourth operation of a method for manufacturing an optical device that supports a wavelength multiplexer or demultiplexer that uses metamaterials for optical fiber communications in accordance with examples as disclosed herein. The fourth operation occurs after the third operation described with reference to FIG. 6C. In some cases, other steps or operations may occur between the third operation and the fourth operation. FIG. 6D illustrates an optical device 604 that includes the substrate 610 and a plurality of metamaterial structures 630 formed from the layer of metamaterial 625 and were formed based on the parameters of the plurality of cavities 620. The optical device 604 is a device as it occurs after the fourth operation in the manufacturing process is complete.

In the fourth operation, portions of the layer of metamaterials 625 and the remaining portions of the resist layer 615 are removed to form (or expose) the plurality of metamaterial structures 630. Each metamaterial structure 630 of the plurality of metamaterial structures include one or more parameters (e.g., cross-sectional profile, cross-sectional area, or height) that are configured based on the parameters of the cavities into which the layer of metamaterial 625 was deposited. In some cases, one or more chemicals may be applied to the optical device 604 to remove the remaining resist layer and the metamaterials that are on top of the remaining resist layer. In some cases, this procedure may be referred to as lift-off. The plurality of metamaterial structures 630 may be formed using one or more etching processes, e-beam lithography, photo-lithography, nanoimprint, or a lift-off process, or any combination thereof. In some cases, a single process from the processes listed above may be used as part of the fourth operation. In some cases, two or more processes from the processes listed above may be used as part of the fourth operation.

Figure 6E:
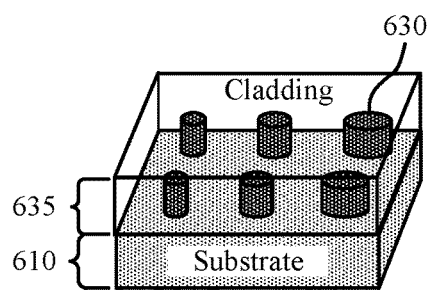

FIG. 6E illustrates an example of a fifth operation of a method for manufacturing an optical device that supports a wavelength multiplexer or demultiplexer that uses metamaterials for optical fiber communications in accordance with examples as disclosed herein. The fifth operation occurs after the fourth operation described with reference to FIG. 6D. In some cases, other steps or operations may occur between the fourth operation and the fifth operation. FIG. 6E illustrates an optical device 605 that includes the substrate 610, a plurality of metamaterial structures 630, and cladding 635. The optical device 605 is a device as it occurs after the fifth operation in the manufacturing process is complete.

In the fifth operation, cladding 635 is deposited on the substrate 610 and the plurality of metamaterial structures 630. The cladding 635 may be an example of the cladding 215 or the cladding 425 described with reference to FIGS. 2A and 4A-4E. The cladding 635 may be configured to protect the metamaterial structures 630 from damage, mitigate losses of optical signals interacting with the metamaterial structures, or any combination thereof.

Figure 6F:
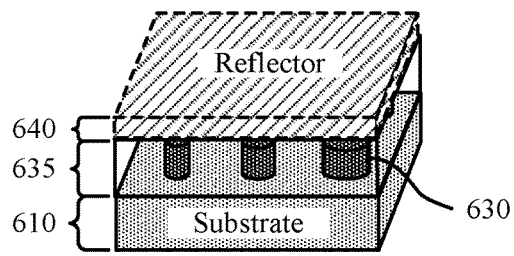

FIG. 6F illustrates an example of a sixth operation of a method for manufacturing an optical device that supports a wavelength multiplexer or demultiplexer that uses metamaterials for optical fiber communications in accordance with examples as disclosed herein. The sixth operation occurs after the fifth operation described with reference to FIG. 6E. In some cases, other steps or operations may occur between the fifth operation and the sixth operation. FIG. 6F illustrates an optical device 606 that includes the substrate 610, a plurality of metamaterial structures 630, cladding 635, and a reflector 640. The optical device 606 is a device as it occurs after the sixth operation in the manufacturing process is complete.

In the sixth operation, a material is deposited to form the reflector 640. In some cases, the material is a reflective material (e.g., a metal such as gold). In some cases, the material is coated with a reflective material (e.g., a metal such as gold) to form the reflector 640. The reflector 640 may be formed to be positioned in proximity to or in contact with the cladding 635. In some cases, the cladding 635 is positioned between the metamaterial structures 630 and the reflector 640. The reflector 640 may be an example of the reflectors 220, 415, and 420 described with reference to FIGS. 2B and 4A-4E. In some cases, the optical device 606 may represent a portion of a completed memory device described with reference to FIGS. 2A-4E.

In the bottom-up approach, the inverse pattern of the desired structure can be first created using lithography techniques, similar to the top-down approach (e.g., see FIGS. 6A and 6B). A thin film layer may then be grown on top of the patterned resist layer 615, filling the holes (e.g., see FIG. 6C). After a lift-off process (e.g., see FIG. 6D), the resist layer 615 as well as the thin film on top the resist can be removed, and the pattern is transferred to the thin film layer to become the metamaterial structures. Depending on the design, a cladding layer can be added to protect or support the structure, using coating techniques (such as spin coating) or deposition techniques described herein (e.g., as shown in FIG. 6E). The reflector (e.g., metal) layer can be added on top of the cladding layer using deposition techniques described herein (e.g., as shown in FIG. 6F).

Figure 7:
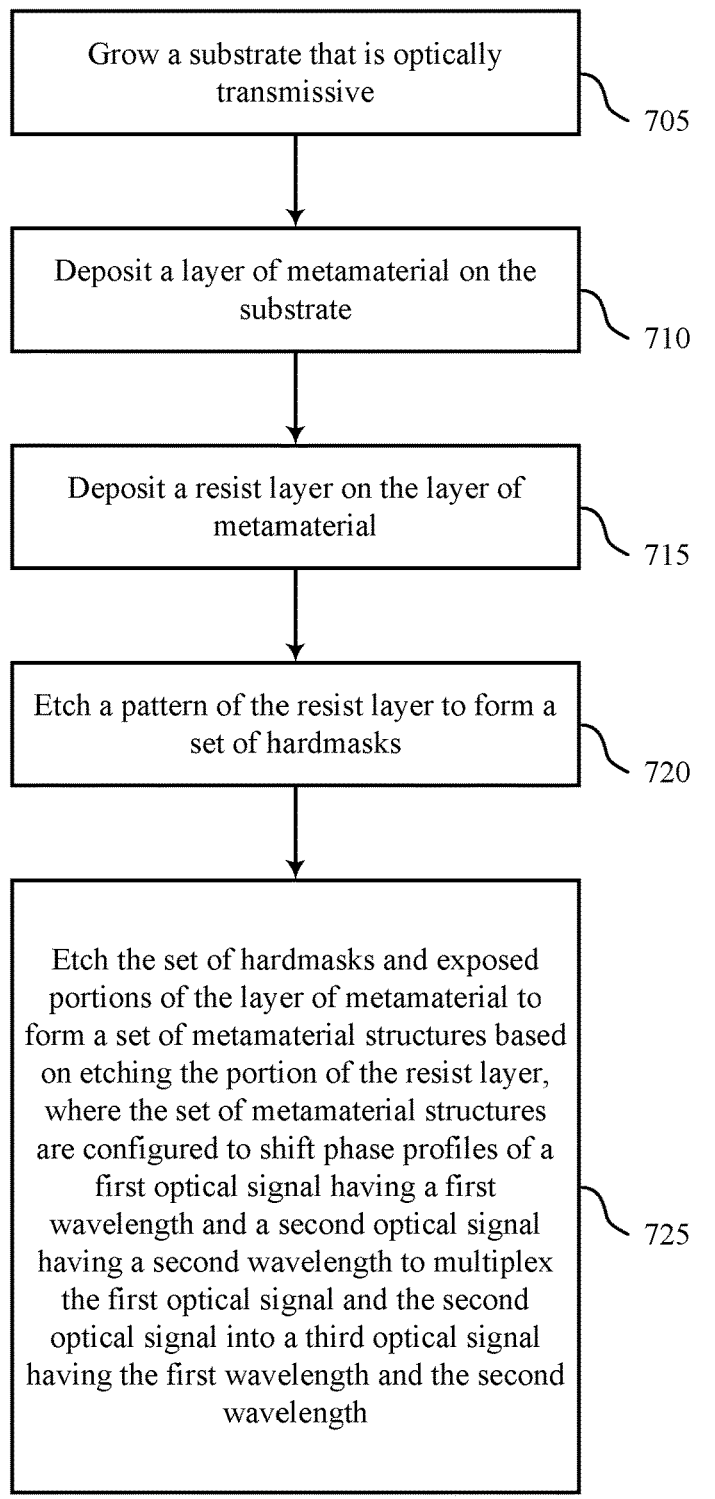
FIGS. 7 and 8 show flowcharts illustrating a method or methods that supports a wavelength multiplexer or demultiplexer that uses metamaterials for optical fiber communications in accordance with examples as disclosed herein.

FIG. 7 shows a flowchart illustrating a method 700 that supports a wavelength multiplexer or demultiplexer that uses metamaterials for optical fiber communications in accordance with examples as disclosed herein. The operations of method 700 may be implemented by a manufacturing system or one or more controllers associated with a manufacturing system. In some examples, one or more controllers may execute a set of instructions to control one or more functional elements of the manufacturing system to perform the described functions. Additionally or alternatively, one or more controllers may perform aspects of the described functions using special-purpose hardware.

At 705, the method 700 may include growing a substrate that is optically transmissive. The operations of 705 may be performed according to the methods described herein.

At 710, the method 700 may include depositing a layer of metamaterial on the substrate. The operations of 710 may be performed according to the methods described herein.

At 715, the method 700 may include depositing a resist layer on the layer of metamaterial. The operations of 715 may be performed according to the methods described herein.

At 720, the method 700 may include etching a pattern of the resist layer to form a set of hardmasks. In some cases, a portion of the resist layer may be etched. The operations of 720 may be performed according to the methods described herein.

At 725, the method 700 may include etching the set of hardmasks and exposed portions of the layer of metamaterial to form a set of metamaterial structures based on etching the portion of the resist layer, where the set of metamaterial structures are configured to shift phase profiles of a first optical signal having a first wavelength and a second optical signal having a second wavelength to multiplex the first optical signal and the second optical signal into a third optical signal having the first wavelength and the second wavelength. In some cases, the set of metamaterial structures may be formed by etching the layer of metamaterial while using the resist as one or more hardmasks during the etching process. The operations of 725 may be performed according to the methods described herein.

In some examples, an apparatus as described herein may perform a method or methods, such as the method 700. The apparatus may include features, means, or instructions (e.g., a non-transitory computer-readable medium storing instructions executable by a processor) for growing a substrate that is optically transmissive, depositing a layer of metamaterial on the substrate, depositing a resist layer on the layer of metamaterial, etching a portion of the resist layer to form a set of hardmasks, and etching the set of hardmasks and exposed portions of the layer of metamaterial to form a set of metamaterial structures based on etching the portion of the resist layer. The set of metamaterial structures may be configured to shift phase profiles of a first optical signal having a first wavelength and a second optical signal having a second wavelength to multiplex the first optical signal and the second optical signal into a third optical signal having the first wavelength and the second wavelength.

Some examples of the method 700 and the apparatus described herein may further include operations, features, means, or instructions for depositing a reflective material to form a reflector at one end of the set of metamaterial structures based on etching the set of hardmasks and the exposed portions of the layer of metamaterial. Some examples of the method 700 and the apparatus described herein may further include operations, features, means, or instructions for depositing cladding on the set of metamaterial structures and on exposed portions of the substrate based on etching the set of hardmasks and the exposed portions of the layer of metamaterial, where depositing the reflective material may be based on depositing the cladding. In some examples of the method 700 and the apparatus described herein, the reflective material may be deposited on the cladding that may be positioned between the set of metamaterial structures and the reflective material.

In some examples of the method 700 and the apparatus described herein, each metamaterial structure of the set of metamaterial structures may have one or more parameters that includes a height of the metamaterial structure, a cross-sectional profile of the metamaterial structure, a diameter of the metamaterial structure, a dielectric property of the metamaterial structure, or any combination thereof. In some examples of the method 700 and the apparatus described herein, at least some of the one or more parameters of each metamaterial structure may be based on a second cross-sectional profile of an associated hardmask.

Figure 8:
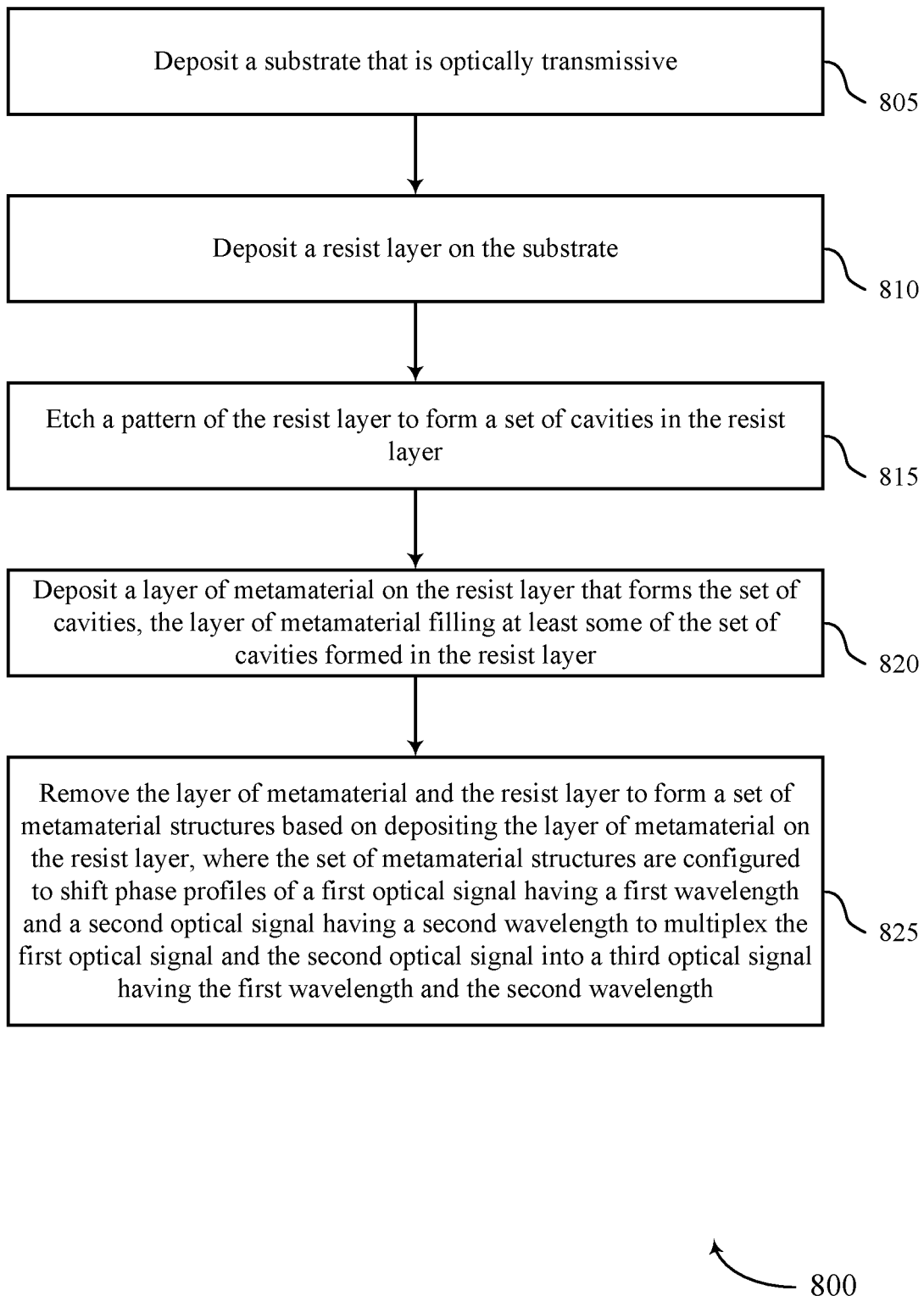

FIG. 8 shows a flowchart illustrating a method 800 that supports a wavelength multiplexer or demultiplexer that uses metamaterials for optical fiber communications in accordance with examples as disclosed herein. The operations of method 800 may be implemented by a manufacturing system or one or more controllers associated with a manufacturing system. In some examples, one or more controllers may execute a set of instructions to control one or more functional elements of the manufacturing system to perform the described functions. Additionally or alternatively, one or more controllers may perform aspects of the described functions using special-purpose hardware.

At 805, the method 800 may include depositing a substrate that is optically transmissive. The operations of 805 may be performed according to the methods described herein.

At 810, the method 800 may include depositing a resist layer on the substrate. The operations of 810 may be performed according to the methods described herein.

At 815, the method 800 may include etching a pattern of the resist layer to form a set of cavities in the resist layer. In some cases, a portion of the resist layer may be etched. The operations of 815 may be performed according to the methods described herein.

At 820, the method 800 may include depositing a layer of metamaterial on the resist layer that forms the set of cavities, the layer of metamaterial filling at least some of the set of cavities formed in the resist layer. The operations of 820 may be performed according to the methods described herein.

At 825, the method 800 may include removing the layer of metamaterial and the resist layer to form a set of metamaterial structures based on depositing the layer of metamaterial on the resist layer, where the set of metamaterial structures are configured to shift phase profiles of a first optical signal having a first wavelength and a second optical signal having a second wavelength to multiplex the first optical signal and the second optical signal into a third optical signal having the first wavelength and the second wavelength. In some cases, one or more chemicals may be applied to the structure to remove the remaining resist layer and the metamaterials that are on top of the remaining resist layer. In some cases, this procedure may be referred to as lift-off. The operations of 825 may be performed according to the methods described herein.

In some examples, an apparatus as described herein may perform a method or methods, such as the method 800. The apparatus may include features, means, or instructions (e.g., a non-transitory computer-readable medium storing instructions executable by a processor) for depositing a substrate that is optically transmissive, depositing a resist layer on the substrate, etching a portion of the resist layer to form a set of cavities in the resist layer, depositing a layer of metamaterial on the resist layer that forms the set of cavities, the layer of metamaterial filling at least some of the set of cavities formed in the resist layer, and etching the layer of metamaterial and the resist layer to form a set of metamaterial structures based on depositing the layer of metamaterial on the resist layer. The set of metamaterial structures can be configured to shift phase profiles of a first optical signal having a first wavelength and a second optical signal having a second wavelength to multiplex the first optical signal and the second optical signal into a third optical signal having the first wavelength and the second wavelength.

Some examples of the method 800 and the apparatus described herein may further include operations, features, means, or instructions for depositing a reflective material to form a reflector at one end of the set of metamaterial structures based on etching the layer of metamaterial and the resist layer. Some examples of the method 800 and the apparatus described herein may further include operations, features, means, or instructions for depositing cladding on the set of metamaterial structures and on exposed portions of the substrate based on etching the layer of metamaterial and the resist layer, where depositing the reflective material may be based on depositing the cladding. In some examples of the method 800 and the apparatus described herein, the reflective material may be deposited on the cladding that may be positioned between the set of metamaterial structures and the reflective material.

In some examples of the method 800 and the apparatus described herein, each metamaterial structure of the set of metamaterial structures may have one or more parameters of the metamaterial structure includes a height of the metamaterial structure, a cross-sectional profile of the metamaterial structure, a diameter of the metamaterial structure, a dielectric property of the metamaterial structure, or any combination thereof. In some examples of the method 800 and the apparatus described herein, at least some of the one or more parameters of each metamaterial structure may be based on a second cross-sectional profile of an associated cavity in the resist layer.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The devices discussed herein, including an optical device, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein may be implemented or performed with a general-purpose processor, a digital signal processor (DSP), an application-specific integrated-circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise random-access memory (RAM), read-only memory (ROM), electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
a first substrate that is optically transmissive;
a first stage of metamaterials in contact with the first substrate;
a second stage of metamaterials in contact with the first substrate;
a reflector positioned opposite the first substrate and configured to reflect an optical signal that passes through the first stage of metamaterials to pass through the first stage of metamaterials again, wherein:
the first stage of metamaterials and the second stage of metamaterials are configured to multiplex a first optical signal having a first wavelength and a second optical signal having a second wavelength into a third optical signal having the first wavelength and the second wavelength, wherein the first stage of metamaterials and the second stage of metamaterials each have a respective phase profile configured to multiplex the first optical signal and the second optical signal into the third optical signal based at least in part on shifting a first phase profile of the first optical signal and shifting a second phase profile of the second optical signal; and
an optical fiber configured for transmission of the third optical signal to one or more receivers based at least in part on the third optical signal being modulated with information.

2. The apparatus of claim 1, wherein:
the first stage of metamaterials is configured to shift the first phase profile of the first optical signal and the second phase profile of the second optical signal and output a first shifted optical signal and a second shifted optical signal; and
the second stage of metamaterials is configured to shift a third phase profile of the first shifted optical signal and a fourth phase profile of the second shifted optical signal and output the third optical signal that comprises the first wavelength and the second wavelength.

3. The apparatus of claim 1, further comprising:
cladding positioned between the first stage of metamaterials and the reflector, the cladding having a thickness configured to mitigate losses of optical signals interacting with the first stage of metamaterials, or to protect the first stage of metamaterials, or a combination thereof.

4. The apparatus of claim 3, wherein the thickness of the cladding is between 500 nanometers and 2 micrometers.

5. The apparatus of claim 1, wherein the reflector comprises a first reflector, the apparatus further comprising:
a second reflector, wherein the first reflector and the second reflector are configured to reflect the first optical signal and the second optical signal, the first substrate positioned between the first reflector and the second reflector.

6. The apparatus of claim 5, wherein:
the first stage of metamaterials and the second stage of metamaterials are positioned in proximity to the first reflector.

7. The apparatus of claim 5, wherein:
the first stage of metamaterials is positioned in proximity to the first reflector; and
the second stage of metamaterials is positioned in proximity to the second reflector.

8. The apparatus of claim 5, wherein:
the first reflector forms a first aperture for receiving the first optical signal and the second optical signal; and
the second reflector forms a second aperture for outputting the third optical signal.

9. The apparatus of claim 5, wherein:
the first reflector forms a first aperture for receiving the first optical signal and the second optical signal and forms a second aperture for outputting the third optical signal.

10. The apparatus of claim 5, wherein the first substrate, the first reflector, the second reflector, the first stage of metamaterials, and the second stage of materials form a Fabry-Perot cavity configured to generate one or more resonant reflections of the first optical signal and the second optical signal.

11. The apparatus of claim 1, wherein the first stage of metamaterials comprises:
a plurality of metamaterial structures arranged in a pattern to shift a phase profile of the optical signal based at least in part on one or more parameters of each metamaterial structure of the plurality of metamaterial structures.

12. The apparatus of claim 11, wherein the one or more parameters of each metamaterial structure comprises a height of the metamaterial structure, a cross-sectional profile of the metamaterial structure, a diameter of the metamaterial structure, a dielectric property of the metamaterial structure, or a combination thereof, and wherein at least one of the one or more parameters of the metamaterial structure is different for a first metamaterials structure compared to a second metamaterial structure.

13. The apparatus of claim 11, wherein a total phase shifting caused by the first stage of metamaterials is based at least in part on a phase shifting profile of each metamaterial structure and the pattern of the plurality of metamaterial structures.

14. The apparatus according to claim 1 comprising multiple stages of metamaterials, wherein there is no air space separations between said multiple stages of metamaterials.

15. The apparatus according to claim 14 further comprising optically clear adhesives (OCAs) positioned between at least one layer of a substrate associated with at least one stage of metamaterials.

16. The apparatus of claim 1 comprising multiple substrates, and at least one set of first stage of metamaterials in contact with each of said substrates.

17. A method, comprising:
growing a substrate that is optically transmissive;
depositing a layer of metamaterial on the substrate;
depositing a resist layer on the layer of metamaterial;

etching a portion of the resist layer to form a plurality of hardmasks;

etching the plurality of hardmasks and exposed portions of the layer of metamaterial to form a plurality of metamaterial structures based at least in part on etching the portion of the resist layer, wherein the plurality of metamaterial structures are configured with a first phase profile to shift phase profiles of a first optical signal having a first wavelength and a second optical signal having a second wavelength to multiplex the first optical signal and the second optical signal into a third optical signal having the first wavelength and the second wavelength; and depositing cladding on the plurality of metamaterial structures and on exposed portions of the substrate based at least in part on etching the plurality of hardmasks and the exposed portions of the layer of metamaterial, wherein the cladding has a thickness configured to mitigate losses of optical signals interacting with the plurality of metamaterial structures.

18. The method of claim 17, further comprising:

depositing a reflective material to form a reflector at one end of the plurality of metamaterial structures based at least in part on etching the plurality of hardmasks and the exposed portions of the layer of metamaterial.

19. The method of claim 18, wherein depositing the reflective material is based at least in part on depositing the cladding.

20. The method of claim 19, wherein the reflective material is deposited on the cladding that is positioned between the plurality of metamaterial structures and the reflective material.

21. The method of claim 17, wherein each metamaterial structure of the plurality of metamaterial structures has one or more parameters that comprises a height of the metamaterial structure, a cross-sectional profile of the metamaterial structure, a diameter of the metamaterial structure, a dielectric property of the metamaterial structure, or a combination thereof.

22. The method of claim 21, wherein at least some of the one or more parameters of each metamaterial structure is based at least in part on a second cross-sectional profile of an associated hardmask.

23. An apparatus, comprising:

a substrate that is optically transmissive;

a stage of metamaterials in contact with the substrate; and a reflector positioned opposite the substrate and configured to reflect an optical signal that passes through the stage of metamaterials to pass through the stage of metamaterials again, wherein the stage of metamaterials is configured to demultiplex a first optical signal modulated with information and having a first wavelength and a second wavelength into a second optical signal having the first wavelength and a third optical signal having the second wavelength, wherein the stage of metamaterials has a first phase profile configured to demultiplex the first optical signal based at least in part on shifting a phase profile of the first optical signal by the stage of metamaterials before and after the first optical signal reflects from the reflector, the second optical signal having a first portion of the information conveyed by the first optical signal and the third optical signal having a second portion of the information conveyed by the first optical signal.

24. The apparatus according to claim 23, wherein there is no air space separations between said reflector and said stage of metamaterials.

\* \* \* \* \*